(12) United States Patent
Itsumi et al.

(10) Patent No.: US 11,692,819 B2
(45) Date of Patent: Jul. 4, 2023

(54) ACOUSTIC SENSOR HAVING WAVEGUIDE AND INSPECTION DEVICE

(71) Applicant: KABUSHIKI KAISHA TOSHIBA, Tokyo (JP)

(72) Inventors: Kazuhiro Itsumi, Tokyo (JP); Tomio Ono, Kanagawa (JP); Yutaka Nakai, Kanagawa (JP); Noriko Yamamoto, Kanagawa (JP); Tsuyoshi Kobayashi, Kanagawa (JP); Akiko Hirao, Kanagawa (JP); Yasuharu Hosono, Kanagawa (JP); Mitsunaga Saito, Chiba (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/012,338

(22) Filed: Sep. 4, 2020

(65) Prior Publication Data

US 2021/0123796 A1   Apr. 29, 2021

(30) Foreign Application Priority Data

Oct. 23, 2019   (JP) .................................. 2019-192658

(51) Int. Cl.
*G01H 9/00*   (2006.01)
*G01N 29/32*   (2006.01)
(Continued)

(52) U.S. Cl.
CPC .............. *G01B 17/02* (2013.01); *G01H 9/00* (2013.01); *G01N 29/11* (2013.01); *G01N 29/221* (2013.01);
(Continued)

(58) Field of Classification Search
CPC .......... G07D 7/08; G07D 7/164; G07D 7/189; G01B 17/02; G01B 2210/42;
(Continued)

(56) References Cited

U.S. PATENT DOCUMENTS 6,407,964 B1   6/2002   Hornung et al.
2004/0150155 A1   8/2004   Okitsu
(Continued)

FOREIGN PATENT DOCUMENTS

CN   104644211 A   *   5/2015   ........... A61B 8/4427
DE   102007045494 A1   *   4/2008   ............. G01H 11/08
(Continued)

OTHER PUBLICATIONS

U.S. Appl. No. 17/192,024, filed Mar. 4, 2021, Nakai.
(Continued)

*Primary Examiner* — David L Singer
(74) *Attorney, Agent, or Firm* — Foley & Lardner LLP

(57) ABSTRACT

A sensor includes a first element part having a first member and a first element. The first member is a acoustic tubular waveguide and extends along a first direction. The acoustic tubular waveguide includes a first opening and a second opening. A direction from the second opening toward the first opening is along the first direction. The first element includes a vibratile first membrane, and a first supporter supporting the first membrane. The second opening is between the first opening and the first membrane in the first direction. The sensor may be a Piezoelectric Micro electro mechanical systems Ultrasonic Transducer and may be used for inspecting paper and/or resin including detecting thickness of a fed through banknote and/or the presence of foreign matter thereon such as tape. An optical element may
(Continued)

alternatively measure the vibration of a membrane from acoustic through transmission instead of an acoustic receiver.

16 Claims, 14 Drawing Sheets

(51) Int. Cl.
| | |
|---|---|
| *G01N 29/22* | (2006.01) |
| *G01B 17/02* | (2006.01) |
| *G01N 29/11* | (2006.01) |
| G01N 29/34 | (2006.01) |
| G01N 29/24 | (2006.01) |
| G01N 29/48 | (2006.01) |
| G07D 7/164 | (2016.01) |
| G07D 7/08 | (2006.01) |
| G07D 7/189 | (2016.01) |

(52) U.S. Cl.
CPC ......... *G01N 29/32* (2013.01); *G01B 2210/44* (2013.01); *G01N 29/2437* (2013.01); *G01N 29/2462* (2013.01); *G01N 29/348* (2013.01); *G01N 29/48* (2013.01); *G01N 2291/0237* (2013.01); *G01N 2291/02809* (2013.01); *G01N 2291/02854* (2013.01); *G01N 2291/048* (2013.01); *G01N 2291/105* (2013.01); *G01N 2291/2632* (2013.01); *G07D 7/08* (2013.01); *G07D 7/164* (2013.01); *G07D 7/189* (2017.05)

(58) Field of Classification Search
CPC ................ G01B 2210/44; G01H 9/00; G01N 2291/0237; G01N 2291/02809; G01N 2291/02854; G01N 2291/048; G01N 2291/105; G01N 2291/2632; G01N 29/11; G01N 29/221; G01N 29/2437; G01N 29/2462; G01N 29/32; G01N 29/348; G01N 29/48; G10K 11/22; G10K 9/22
See application file for complete search history.

(56) References Cited

U.S. PATENT DOCUMENTS

| | | | | |
|---|---|---|---|---|
| 2009/0184830 | A1 | 7/2009 | Watabe et al. | |
| 2009/0310981 | A1* | 12/2009 | Ishida | G03G 15/65 399/17 |
| 2009/0310992 | A1* | 12/2009 | Iwasa | G03G 15/5029 399/45 |
| 2011/0142459 | A1* | 6/2011 | Aoki | G03G 15/6564 399/12 |
| 2012/0061901 | A1* | 3/2012 | Yamamoto | G01N 29/4445 73/632 |
| 2012/0095345 | A1* | 4/2012 | Nakazawa | A61B 8/4444 600/454 |
| 2012/0294636 | A1* | 11/2012 | Ishida | G03G 15/65 73/632 |
| 2013/0224791 | A1 | 8/2013 | Taft et al. | |
| 2014/0216158 | A1 | 8/2014 | Sanabria Martin et al. | |
| 2014/0269205 | A1* | 9/2014 | Blair | G07D 7/08 367/137 |
| 2014/0377450 | A1 | 12/2014 | Knorr | |
| 2015/0037053 | A1* | 2/2015 | Ishida | G01N 29/2468 73/632 |
| 2017/0017181 | A1* | 1/2017 | Watanabe | G03G 15/5029 |
| 2017/0108473 | A1 | 4/2017 | Bestebreurtje | |
| 2018/0181045 | A1* | 6/2018 | Watanabe | G01H 17/00 |
| 2019/0088710 | A1 | 3/2019 | Itsumi | |
| 2019/0283995 | A1 | 9/2019 | Itsumi | |
| 2019/0353480 | A1* | 11/2019 | Osawa | B65H 7/125 |
| 2020/0080974 | A1 | 3/2020 | Itsumi | |
| 2020/0240843 | A1* | 7/2020 | Kanai | G01J 3/50 |
| 2021/0123796 | A1 | 4/2021 | Itsumi et al. | |

FOREIGN PATENT DOCUMENTS

| | | | | |
|---|---|---|---|---|
| JP | 2000-025988 | A | | 1/2000 |
| JP | 2001351141 | A * | | 12/2001 |
| JP | 3860126 | B2 | | 12/2006 |
| JP | 2012-063276 | A | | 3/2012 |
| JP | 2013217926 | A * | 10/2013 | ......... G03G 15/5029 |
| JP | 2014186349 | A * | 10/2014 | ............ G03G 15/65 |
| JP | 2019-057804 | A | | 4/2019 |
| JP | 2019082484 | A * | 5/2019 | ............ G01N 29/11 |
| JP | 2019108230 | A * | 7/2019 | ............ G01N 29/11 |
| JP | 2019-158772 | A | | 9/2019 |
| JP | 6581712 | B2 * | 9/2019 | ............ G01N 29/11 |
| JP | 2020027953 | A * | 2/2020 | ............ G01S 7/521 |
| JP | 2020-043476 | A | | 3/2020 |
| JP | 2020122661 | A * | 8/2020 | ............ B41J 29/38 |
| JP | 2021-067543 | A | | 4/2021 |
| KR | 20100072539 | A * | 7/2010 | ............... G07D 7/08 |
| WO | WO-2007/132671 | A | | 11/2007 |
| WO | WO-2008130111 | A1 * | 10/2008 | ............... G07D 7/08 |

OTHER PUBLICATIONS

U.S. Non-Final Office Action on U.S. Appl. No. 17/192,024 dated Dec. 19, 2022 (10 pages).
U.S. Notice of Allowance on U.S. Appl. No. 17/192,024 dated Mar. 29, 2023 (9 pages).

* cited by examiner

ACOUSTIC SENSOR HAVING WAVEGUIDE AND INSPECTION DEVICE

CROSS-REFERENCE TO RELATED APPLICATIONS

This application is based upon and claims the benefit of priority from Japanese Patent Application No. 2019-192658, filed on Oct. 23, 2019; the entire contents of which are incorporated herein by reference.

FIELD

Embodiments of the invention generally relate to a sensor and an inspection device.

BACKGROUND

For example, a sensor of an ultrasonic wave or the like is used to inspect an object (an inspection object) such as a banknote or the like. It is desirable to improve the resolution of the sensor and an inspection device.

DETAILED DESCRIPTION

Figure 1A:
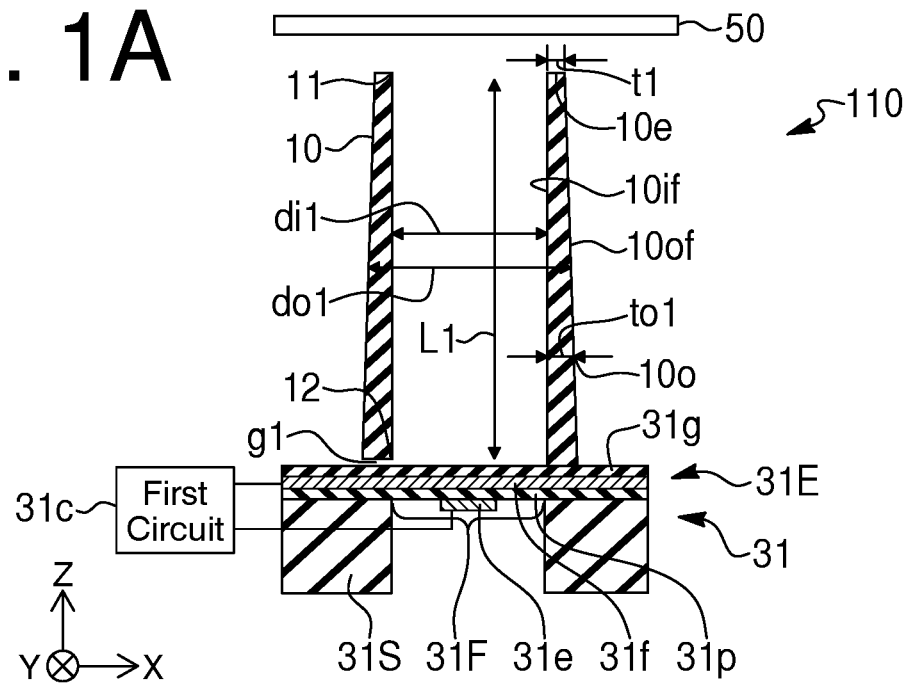
FIGS. 1A and 1B are schematic views illustrating a sensor according to a first embodiment.

According to an embodiment of the invention, a sensor includes a first element part. The first element part includes a first member and a first element. The first member is tubular and extends along a first direction. The first member includes a first opening and a second opening. The direction from the second opening toward the first opening is along the first direction. The first element includes a vibratile first membrane, and a first supporter supporting the first membrane. The second opening is between the first opening and the first membrane in the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

Figure 1B:
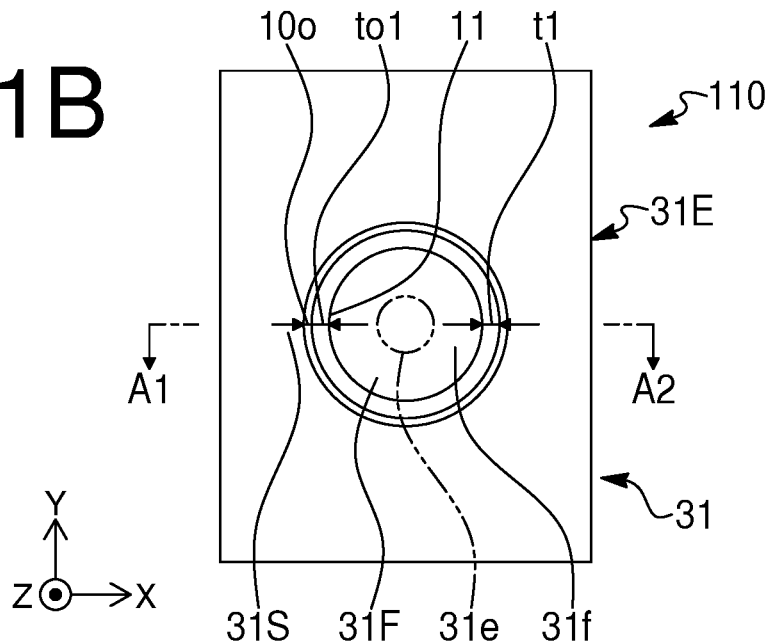

FIGS. 1A and 1B are schematic views illustrating a sensor according to a first embodiment.

FIG. 1A is a line A1-A2 cross-sectional view of FIG. 1B. FIG. 1B is a plan view.

As shown in FIGS. 1A and 1B, the sensor 110 according to the embodiment includes a first element part 31E. The first element part 31E includes a first member 10 and a first element 31.

The first member 10 is tubular and extends along a first direction. The first direction is taken as a Z-axis direction. One direction perpendicular to the Z-axis direction is taken as an X-axis direction. A direction perpendicular to the Z-axis direction and the X-axis direction is taken as a Y-axis direction.

The first member 10 includes a first opening 11 and a second opening 12. The direction from the second opening 12 toward the first opening 11 is along the first direction (the Z-axis direction).

The first element 31 includes a first membrane 31F and a first supporter 31S. The first membrane 31F can vibrate. The first supporter 31S supports the first membrane 31F. For example, the thickness along the Z-axis direction of the first membrane 31F is less than the thickness along the Z-axis direction of the first supporter 31S.

In the example, the second opening 12 is between the first opening 11 and the first membrane 31F in the first direction (the Z-axis direction).

For example, the first membrane 31F includes a first piezoelectric layer 31p, a first electrode 31e, and a first counter electrode 31f. The first piezoelectric layer 31p is provided between the first electrode 31e and the first counter electrode 31f. For example, the first membrane 31F further includes a first base 31g. For example, the first counter electrode 31f is provided between the first electrode 31e and the first base 31g. For example, the first piezoelectric layer 31p deforms according to a voltage applied to these electrodes, and as a result, the first membrane 31F flexurally vibrates.

A first circuit 31c is provided. For example, the first circuit 31c is included in the sensor 110. The first circuit 31c is electrically connected to the first electrode 31e and the first counter electrode 31f.

For example, the first circuit 31c applies an alternating current voltage between the first electrode 31e and the first counter electrode 31f. Thereby, the first membrane 31F is caused to vibrate. For example, the first membrane 31F flexurally vibrates. Thereby, a sound wave (e.g., an ultrasonic wave) is generated from the first membrane 31F. In such a case, the first element 31 functions as a sound wave transmitter.

On the other hand, the first membrane 31F vibrates when a sound wave (e.g., an ultrasonic wave) is applied to the first membrane 31F. A voltage is generated between the first electrode 31e and the first counter electrode 31f according to the vibration. The first circuit 31c receives the generated voltage and is configured to output a signal corresponding to the voltage. In such a case, the first element 31 functions as a sound wave receiver.

When the first element 31 functions as a transmitter, the sound wave that is emitted from the first element 31 strikes an object 50. For example, the sound wave that passes through the object 50 is detected by a receiver. The receiver may be another first element 31. The strength or the like of the sound wave detected by the receiver changes according to the existence or absence of the object 50. The strength of the sound wave detected by the receiver changes according to the characteristics of the object 50. The existence or absence of the object and the characteristics of the object 50 can be detected thereby. For example, the sensor 110 can be utilized as an inspection device.

When the first element 31 functions as a receiver, a sound wave that is emitted from a transmitter strikes the object 50. For example, the sound wave that passes through the object 50 is detected by the first element 31. The transmitter may be another first element 31. The strength or the like of the sound wave detected by the first element 31 changes according to the existence or absence of the object 50. The strength of the sound wave detected by the first element 31 changes according to the characteristics of the object 50. The existence or absence of the object and the characteristics of the object 50 can be detected thereby. For example, the sensor 110 can be utilized as an inspection device.

In the embodiment, a tubular first member 10 is provided. For example, when the first element 31 functions as a transmitter, the sound wave that is generated by the vibration of the first membrane 31F passes through the interior of the tubular first member 10 and is emitted toward the object 50. For example, when the first element 31 functions as a receiver, the sound wave that passes through the object 50 passes through the interior of the tubular first member 10 and is incident on the first element 31.

For example, by providing the tubular first member 10, the spreading of the sound wave can be suppressed. For example, the sound waves that spread by being diffracted by the edges of the object 50, etc., can be prevented from being incident on the first element 31. According to the embodiment, high resolution is obtained thereby.

The first member 10 includes a first end portion 10e and a first other portion 10o. The first end portion 10e corresponds to the first opening 11. The position in the first direction (the Z-axis direction) of the first other portion 100 is between the position in the first direction of the first end portion 10e and the position in the first direction of the first element 31. The first end portion 10e is distant to the first element 31. The first other portion 10o is proximate to the first element 31.

The thickness of the first end portion 10e along a second direction crossing the first direction (the Z-axis direction) is taken as a first thickness t1. The second direction is any direction crossing the Z-axis direction. For example, the second direction is taken as the X-axis direction. For example, the first thickness t1 is the thickness along the X-axis direction of the first end portion 10e.

The thickness of the first other portion 10o along the second direction (e.g., the X-axis direction) is taken as a thickness to1. In the embodiment, the first thickness t1 of the first end portion 10e is less than the thickness to1 of the first other portion 10o. Thereby, a sensor and an inspection device can be provided in which the resolution can be increased.

When the first element 31 functions as a transmitter, the sound wave that is generated by the first membrane 31F propagates through the interior of the tubular first member 10 and is emitted from the first opening 11 of the first end portion 10e. For example, the first member 10 functions as a waveguide. For example, a sound wave that has high directivity can be incident on the object 50. High resolution is obtained thereby.

When the first end portion 10e is thick, the sound wave that is reflected by the object 50 is easily reflected by the first end portion 10e. The sound wave that is reflected by the first end portion 10e and the sound wave that is directly emitted from the first opening 11 are incident on the object 50. In such a case, noise is easily generated by the sound wave reflected by the first end portion 10e. The resolution is easily reduced by the noise.

In the embodiment, the first thickness t1 of the first end portion 10e is less than the thickness to1 of the first other portion 10o. Therefore, the reflection by the first end portion 10e of the sound wave reflected by the object 50 can be suppressed. The noise due to the reflection by the first end portion 10e is suppressed thereby. In the embodiment, a sensor and an inspection device can be provided in which the resolution can be increased.

For example, when the first element 31 functions as a receiver, the sound wave that passes through the object 50 propagates through the interior of the tubular first member 10 and is incident on the first element 31. For example, the first member 10 functions as a waveguide. When the first member 10 is not provided, the sound wave that passes through the object 50 spreads and is not efficiently incident on the first element 31. In the embodiment, because the first member 10 is provided, the sound wave that is emitted from the object 50 can be efficiently incident on the first element 31. High resolution is obtained thereby.

When the first end portion 10e is thick, the sound wave that is emitted from the object 50 is easily reflected by the first end portion 10e. The sound wave that is reflected by the first end portion 10e travels toward the object 50. The sound wave that is reflected by the first end portion 10e and reflected by the object 50 and the sound wave that is directly emitted from the object 50 are incident on the first element 31. In such a case, noise is easily generated by the sound wave reflected by the first end portion 10e. The resolution is easily reduced by the noise.

In the embodiment, the first thickness t1 of the first end portion 10e is less than the thickness to1 of the first other portion 10o. Therefore, the reflection by the first end portion 10e can be suppressed. The noise due to the reflection by the first end portion 10e is suppressed thereby. In the embodiment, a sensor and an inspection device can be provided in which the resolution can be increased.

For example, when the thickness of the first member 10 is thin over the entirety, it is difficult to obtain a sufficient strength of the first member 10. A sufficient strength is easily obtained by increasing the thickness of a portion of the first member 10 other than the first end portion 10e. The reflection at the first end portion 10e can be suppressed by reducing the thickness of the portion including the first end portion 10e.

In the embodiment, the first thickness t1 of the first end portion 10e is less than the wavelength of the sound wave emitted from the first membrane 31F. The reflection of the sound wave by the first end portion 10e can be effectively suppressed thereby.

In the embodiment, the wavelength of the transmitted or received sound wave is, for example, not less than 2 mm and not more than 5 mm. The frequency of the sound wave is, for example, not less than 70 kHz and not more than 170 kHz.

The first thickness t1 of the first end portion 10e is less than the wavelength of the sound wave incident on the first element 31. The reflection of the sound wave by the first end portion 10e can be effectively suppressed thereby.

In the embodiment, a length L1 along the first direction (the Z-axis direction) of the first member 10 (referring to FIG. 1A) is not less than 5 times the wavelength of the sound wave. Thereby, for example, high directivity is obtained. For example, high resolution is easily obtained. In the embodiment, the length L1 is, for example, not less than 20 mm and not more than 100 mm.

For example, a first inner diameter di1 of the first member 10 substantially does not change. A first outer diameter do1 of the first member 10 changes. For example, the change rate (the gradient) of the first outer diameter do1 of the first member 10 with respect to the change of the position in the first direction (the Z-axis direction) is greater than the change rate (the gradient) of the first inner diameter di1 of the first member 10 with respect to the change of the position in the first direction. The change of the first outer diameter do1 may be continuous or discontinuous (step-like).

The change amount of the first inner diameter di1 of the first member 10 is not more than 0.1 times the length L1 along the first direction of the first member 10. The change amount of the first inner diameter di1 of the first member 10 may be 0.01 times the length L1 along the first direction of the first member 10 or less. By setting the change of the first inner diameter di1 to be small, the sound wave can be efficiently guided through the space inside the first member 10. In the embodiment, the first inner diameter di1 is, for example, not less than 3 mm and not more than 6 mm.

For example, the first member 10 includes a first inner side surface 10if and a first outer side surface 10of. The angle between the first direction (the Z-axis direction) and at least a portion of the first outer side surface 10of is greater than the angle between the first direction (the Z-axis direction) and the first inner side surface 10if. For example, the first inner side surface 10if is substantially parallel to the Z-axis direction. For example, at least a portion of the first outer side surface 10of may be tilted with respect to the first direction (the Z-axis direction).

In the embodiment, the acoustic impedance of the first member 10 is not less than 1000 times the acoustic impedance of air. For example, the sound wave can be efficiently guided through the space inside the first member 10.

The first member 10 includes, for example, at least one selected from the group consisting of iron, aluminum, paper, and a resin. For example, the sound wave can be efficiently guided through the space inside the first member 10.

As shown in FIG. 1A, a gap g1 may be provided between the first member 10 and the first element 31. By providing the gap g1, foreign matter or the like that enters the first member 10 is easily removed. The length along the first direction (the Z-axis direction) of the gap g1 is not more than ¼ times the wavelength of the sound wave. At least a portion of the first member 10 may contact the first element 31.

In the example as shown in FIG. 1B, the shape of the first inner side surface 10if of the first member 10 is circular. The shape is arbitrary in the embodiment.

Figure 2A:
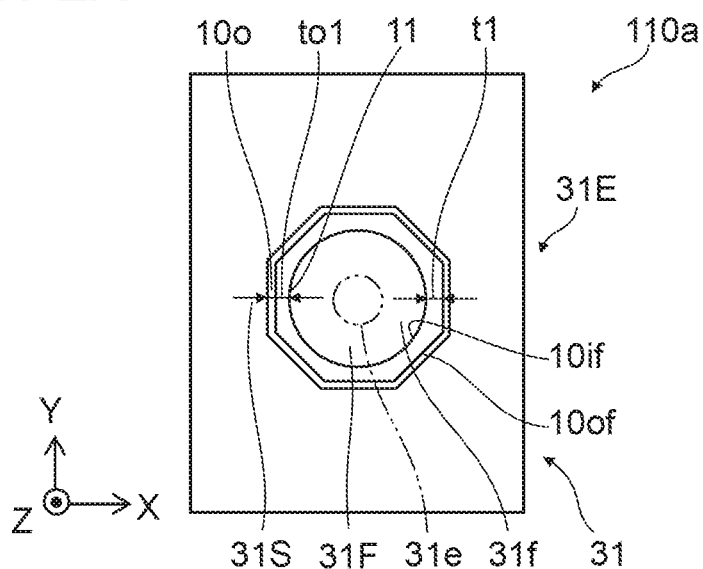
FIGS. 2A and 2B are plan views illustrating sensors according to the first embodiment.
Figure 2B:
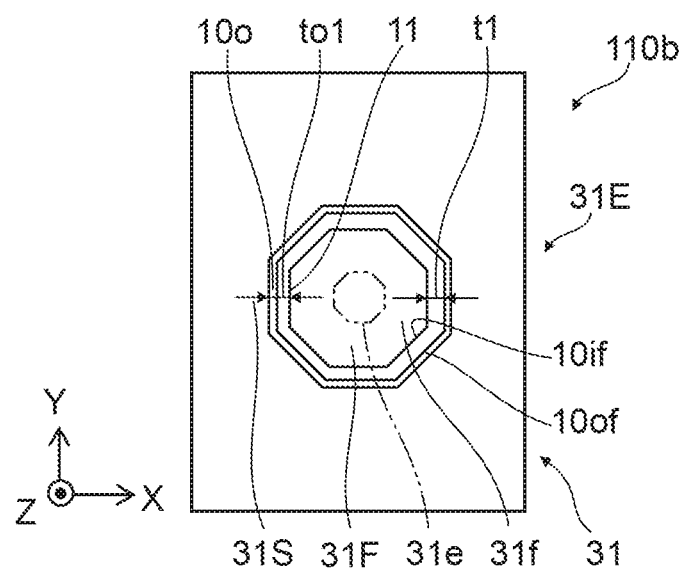

FIGS. 2A and 2B are plan views illustrating sensors according to the first embodiment.

The shape of the first inner side surface 10if of the first member 10 is polygonal in a sensor 110a illustrated in FIG. 2A and a sensor 110b illustrated in FIG. 2B. In the example, the shape of the first inner side surface 10if is octagonal. The number of vertices of the polygon is arbitrary. For example, the shape of the first inner side surface 10if of the first member 10 in a cross section (the X-Y plane) perpendicular to the first direction (the Z-axis direction) may be polygonal.

As in the sensor 110a illustrated in FIG. 2A, the planar shape of the first membrane 31F may be circular. As in the sensor 110b illustrated in FIG. 2B, the planar shape of the first membrane 31F may be polygonal.

As in the sensor 110a illustrated in FIG. 2A, the planar shape of the first electrode 31e may be circular. As in the sensor 110b illustrated in FIG. 2B, the planar shape of the first electrode 31e may be polygonal.

Figure 3A:
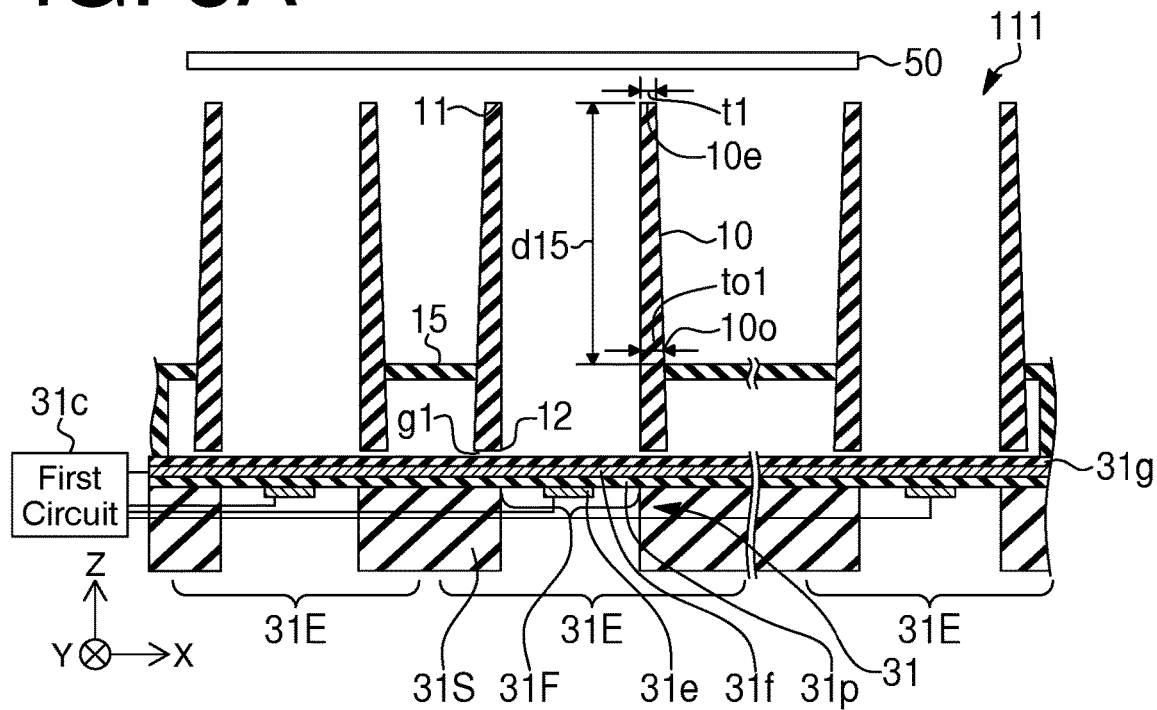
FIGS. 3A and 3B are schematic views illustrating a sensor according to the first embodiment.
Figure 3B:
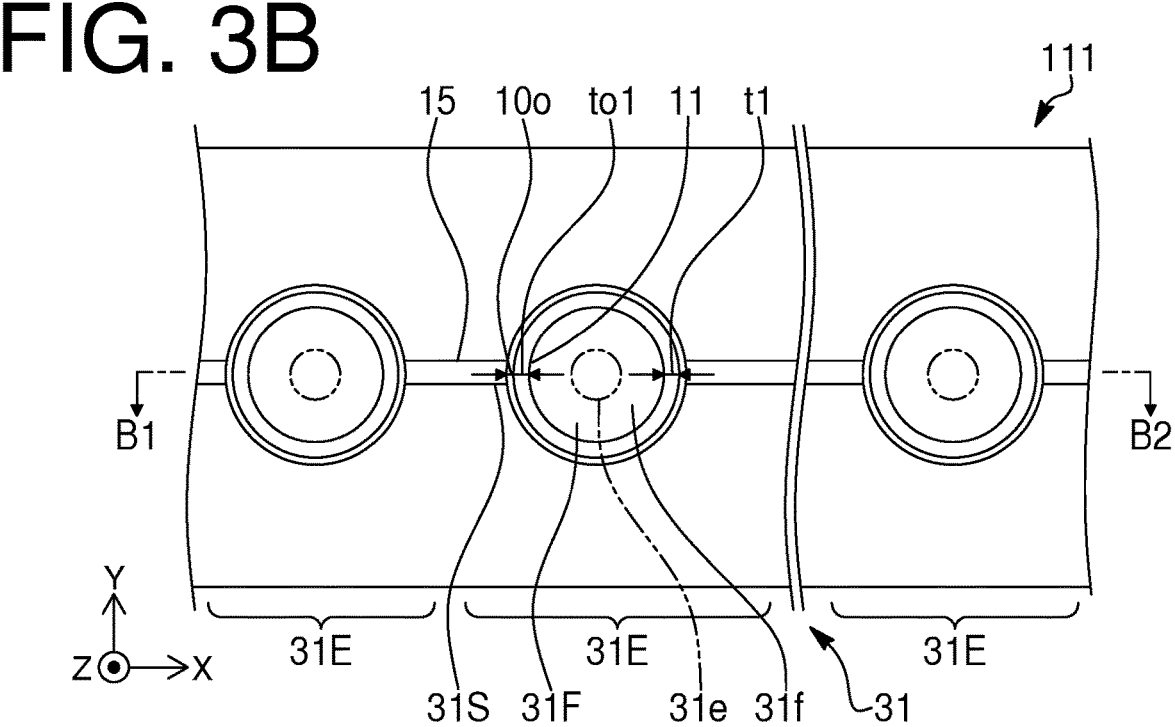

FIGS. 3A and 3B are schematic views illustrating a sensor according to the first embodiment.

FIG. 3A is a line B1-B2 cross-sectional view of FIG. 3B. FIG. 3B is a plan view.

As shown in FIGS. 3A and 3B, the sensor 111 according to the embodiment includes multiple first element parts 31E. The multiple first element parts 31E each have the configuration described in reference to the sensor 110, the sensor 110a, or the sensor 110b. The multiple first element parts 31E each include, for example, the first member 10 and the first element 31. For example, the multiple first element parts 31E are arranged along the X-axis direction. For example, the multiple first element parts 31E may be arranged along the X-axis direction and the Y-axis direction.

For example, the in-plane distribution of the characteristics (the thickness, the foreign matter, etc.) of the object 50 can be detected by the multiple first element parts 31E. For example, the object 50 can be efficiently inspected in a state in which the object 50 moves relative to the multiple first members 10 along the X-axis direction. For example, the first member 10 is provided in each of the multiple first elements 31. Thereby, for example, crosstalk between the multiple first elements 31 can be suppressed.

In the example, the sensor 111 includes a first link member 15. The first link member 15 links one of the multiple first members 10 and another one of the multiple first members 10. The first link member 15 may be fixed to the first supporter 31S.

The first link member 15 links the first member 10 of one of the multiple first element parts 31E and the first member 10 of another one of the multiple first element parts 31E. The distance along the first direction (the Z-axis direction) between the first link member 15 and the first end portion 10e of the first member 10 of the one of the multiple first element parts 31E is taken as a distance d15. The distance d15 is not less than 5 times the wavelength of the sound wave emitted from the first membrane 31F of the first element 31 of the one of the multiple first element parts 31E. Thereby, the noise, etc., can be suppressed when the sound wave reflected by the first link member 15 travels toward the object 50, etc. For example, the distance d15 is not less than 5 times the wavelength of the sound wave received by the first membrane 31F of the first element 31 of the one of the multiple first element parts 31E.

When the multiple first element parts 31E are provided, the first supporter 31S of one of the multiple first element parts 31E may be continuous with the first supporter 31S of another one of the multiple first element parts 31E. The first counter electrode 31f of one of the multiple first element parts 31E may be continuous with the first counter electrode 31f of another one of the multiple first element parts 31E. The first piezoelectric layer 31p of one of the multiple first element parts 31E may be continuous with the first piezoelectric layer 31p of another one of the multiple first element parts 31E.

Second Embodiment

Figure 4A:
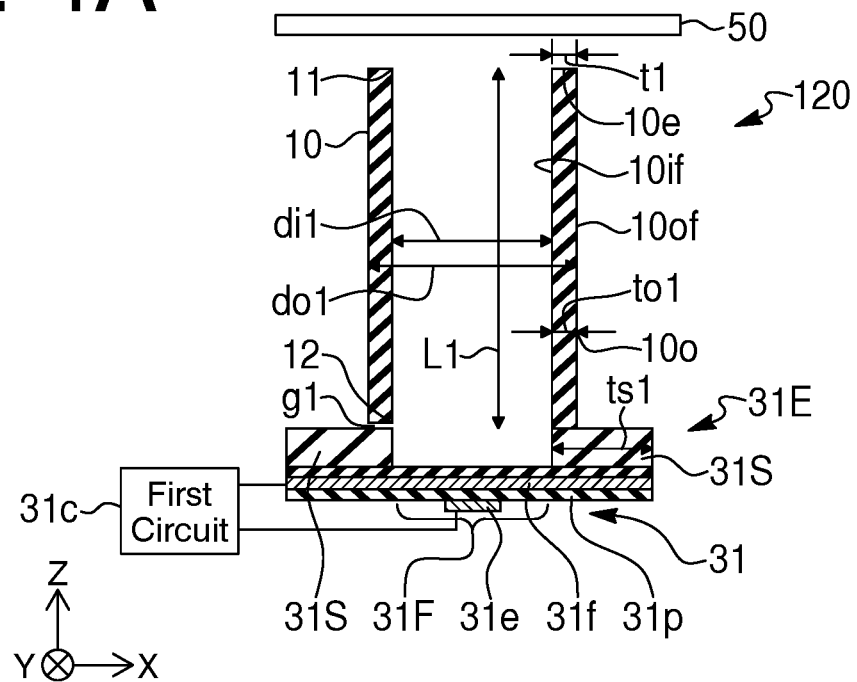
FIGS. 4A and 4B are schematic views illustrating a sensor according to a second embodiment.
Figure 4B:
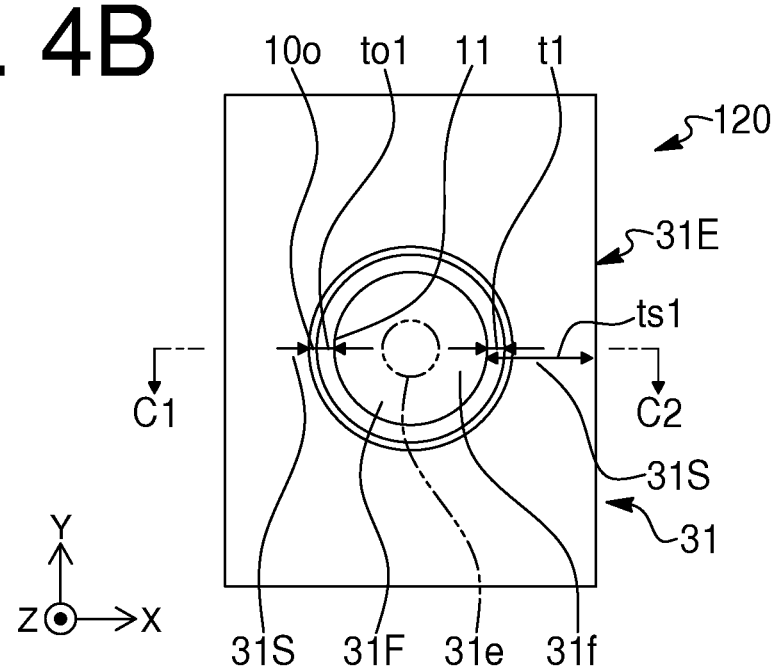

FIGS. 4A and 4B are schematic views illustrating a sensor according to a second embodiment.

FIG. 4A is a line C1-C2 cross-sectional view of FIG. 4B. FIG. 4B is a plan view.

As shown in FIGS. 4A and 4B, the sensor 120 according to the embodiment includes the first element part 31E. The first element part 31E includes the first member 10 and the first element 31. In such a case as well, the first member 10 is tubular and extends along the first direction (the Z-axis direction). The first member 10 includes the first opening 11 and the second opening 12. The direction from the second opening 12 toward the first opening 11 is along the first direction (the Z-axis direction). The first element 31 includes the vibratile first membrane 31F, and the first supporter 31S supporting the first membrane 31F. The second opening 12 is between the first opening 11 and the first membrane 31F in the first direction (the Z-axis direction).

The first member 10 includes the first end portion 10e corresponding to the first opening 11. The position in the first direction (the Z-axis direction) of at least a portion of the first supporter 31S is between the position in the first direction of the first membrane 31F and the position in the first direction of the first end portion 10e.

The first thickness t1 of the first end portion 10e along the second direction (e.g., the X-axis direction) crossing the first direction is less than a thickness ts1 of the first supporter 31S along the second direction. By setting the first thickness t1 to be thin, the reflection of the sound wave by the first end portion 10e can be suppressed. A sensor and an inspection device can be provided in which the resolution can be increased. For example, the second direction may be perpendicular to the first direction.

In the sensor 120, the first member 10 and the first supporter 31S can function as waveguides. The sensor 120 can function as a transmitter of the sound wave or a receiver of the sound wave.

In the sensor 120, the first member 10 may include the first end portion 10e, which corresponds to the first opening 11, and the first other portion 10o. The position in the first direction of the first other portion 10o is between the position in the first direction of the first end portion 10e and the position in the first direction of the first element 31. The first thickness t1 of the first end portion 10e along the second direction (e.g., the X-axis direction) may be less than the thickness to1 of the first other portion 10o along the second direction.

In the sensor 120, the first thickness t1 is, for example, less than the wavelength of the sound wave emitted from the first membrane 31F. For example, the length L1 along the first direction (the Z-axis direction) of the first member 10 is not less than 5 times the wavelength of the sound wave. For example, the length L1 is greater than the length along the first direction of the first supporter 31S.

The change amount of the first inner diameter di1 of the first member 10 is not more than 0.1 times the length L1 along the first direction of the first member 10. The change amount of the first inner diameter di1 of the first member 10 may be 0.01 times the length L1 along the first direction of the first member 10 or less.

For example, the shape of the first inner side surface 10if of the first member 10 in a cross section perpendicular to the first direction (the Z-axis direction) may be circular or polygonal. The change rate (e.g., the gradient) of the first outer diameter do1 of the first member 10 with respect to the change of the position in the first direction may be greater than the change rate (e.g., the gradient) of the first inner diameter di1 of the first member 10 with respect to the change of the position in the first direction. The change of the first outer diameter do1 may be continuous or discontinuous (step-like).

In the sensor 120 as well, the acoustic impedance of the first member 10 is not less than 1000 times the acoustic impedance of air. The first member 10 includes, for example, at least one selected from the group consisting of iron, aluminum, paper, and a resin. As shown in FIG. 4A, the gap g1 may be provided between the first member 10 and the first element 31. By providing the gap g1, foreign matter or the like that enters the first member 10 is easily removed. The length along the first direction (the Z-axis direction) of the gap g1 is not more than ¼ times the wavelength of the sound wave. At least a portion of the first member 10 may contact the first element 31.

Figure 5A:
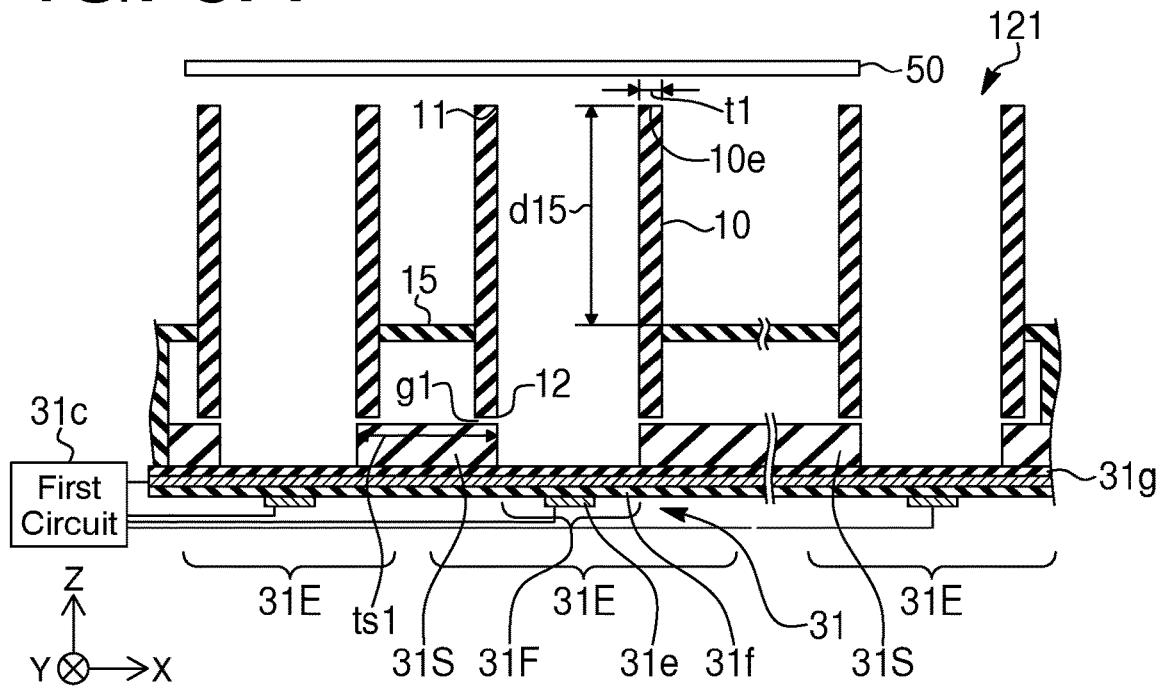
FIGS. 5A and 5B are schematic views illustrating a sensor according to the second embodiment.
Figure 5B:
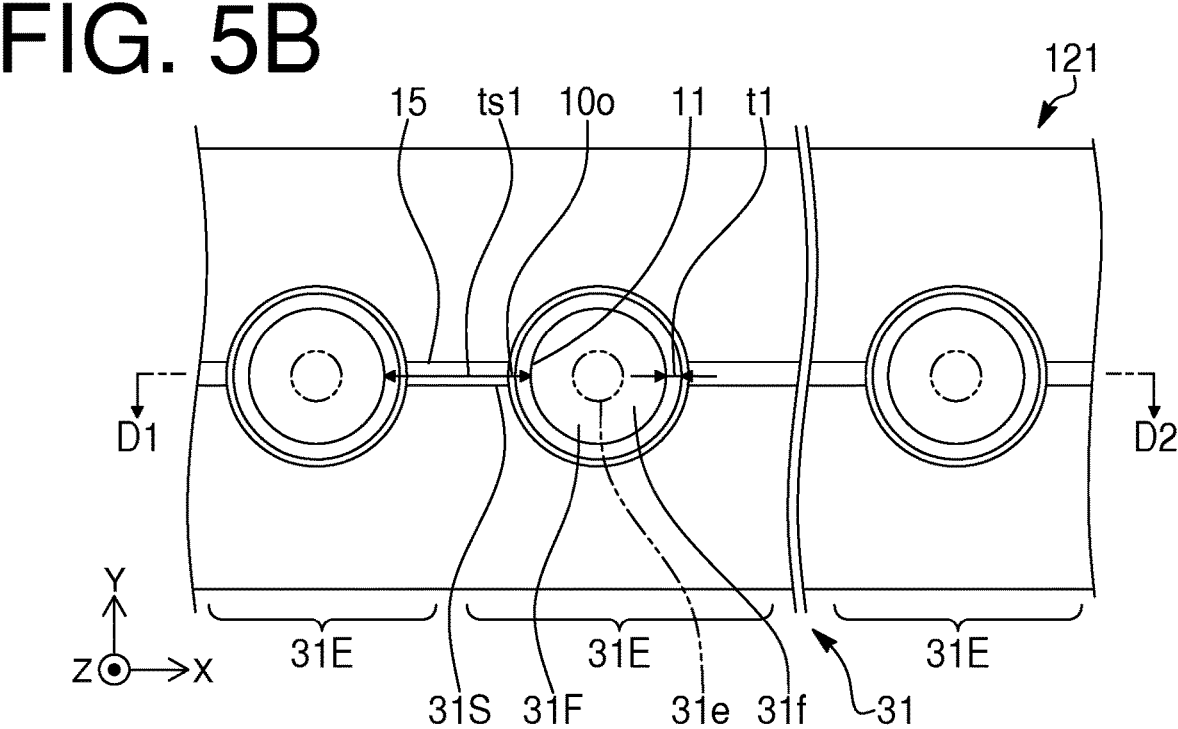

FIGS. 5A and 5B are schematic views illustrating a sensor according to the second embodiment.

FIG. 5A is a line D1-D2 cross-sectional view of FIG. 5B. FIG. 5B is a plan view.

As shown in FIGS. 5A and 5B, the sensor 121 according to the embodiment includes multiple first element parts 31E. The multiple first element parts 31E each have the configuration described in reference to the sensor 120. For example, the first member 10 is provided in each of the multiple first elements 31. Thereby, for example, the crosstalk between the multiple first elements 31 can be suppressed.

The first link member 15 may be provided in the sensor 120. The first link member 15 links one of the multiple first members 10 and another one of the multiple first members 10. The first link member 15 may be fixed to the first supporter 31S.

The distance d15 along the first direction (the Z-axis direction) between the first link member 15 and the first end portion 10e of the one of the multiple first element parts 31E is not less than 5 times the wavelength of the sound wave emitted from the first membrane 31F of the one of the multiple first element parts 31E. Thereby, the noise, etc., can be suppressed when the sound wave reflected by the first link member 15 travels toward the object 50, etc.

Third Embodiment

A second element part is provided in the third embodiment. An example of the second element part will now be described.

Figure 6A:
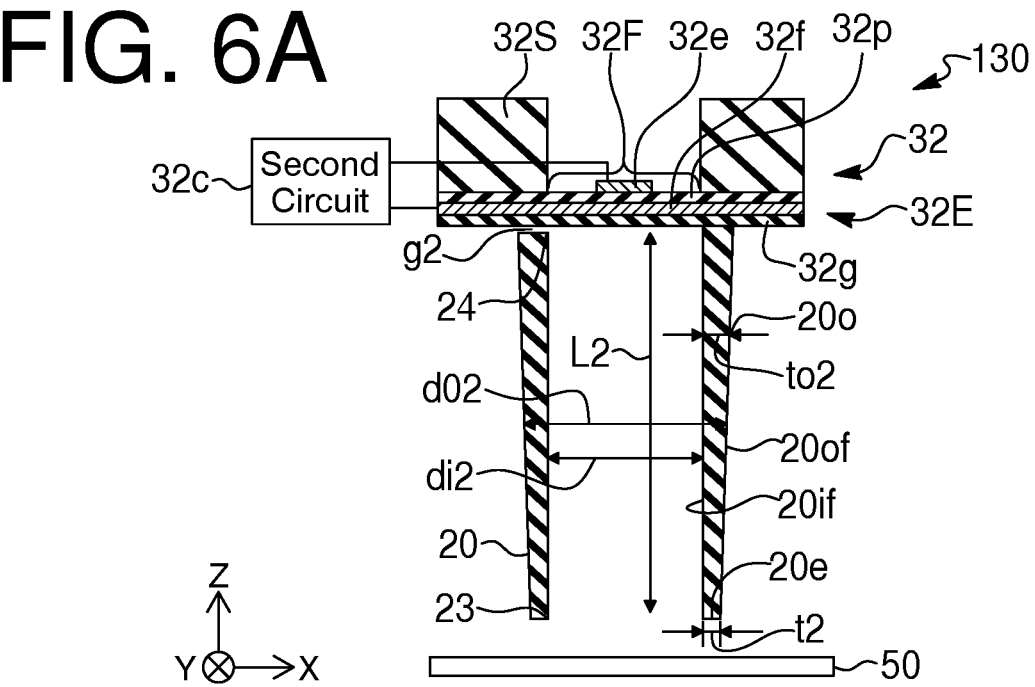
FIGS. 6A and 6B are schematic views illustrating a sensor according to the third embodiment.
Figure 6B:
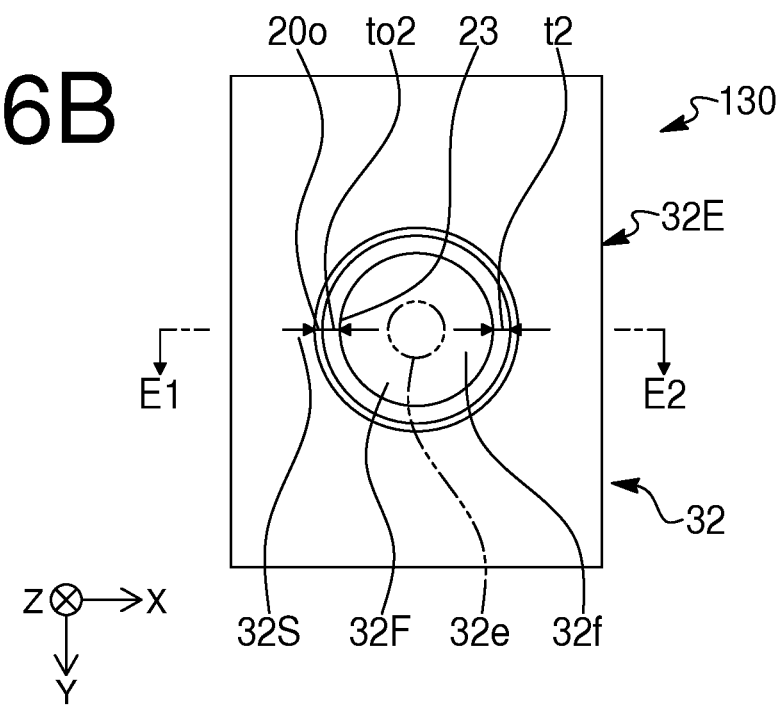

FIGS. 6A and 6B are schematic views illustrating a sensor according to the third embodiment.

FIG. 6A is a line E1-E2 cross-sectional view of FIG. 6B. FIG. 6B is a plan view.

As shown in FIGS. 6A and 6B, the sensor 130 according to the embodiment includes the second element part 32E. The second element part 32E includes a second member 20 and a second element 32.

The second member 20 is tubular and extends along the first direction (the Z-axis direction). The second member 20 includes a third opening 23 and a fourth opening 24. The direction from the third opening 23 toward the fourth opening 24 is along the first direction (the Z-axis direction).

The second element 32 includes a vibratile second membrane 32F, and a second supporter 32S supporting the second membrane 32F. The fourth opening 24 is between the third opening 23 and the second membrane 32F in the first direction (the Z-axis direction).

For example, the second membrane 32F includes a second piezoelectric layer 32p, a second electrode 32e, and a second counter electrode 32f. The second piezoelectric layer 32p is provided between the second electrode 32e and the second counter electrode 32f. For example, the second membrane 32F further includes a second base 32g. For example, the second counter electrode 32f is provided between the second electrode 32e and the second base 32g. For example, the second piezoelectric layer 32p deforms according to a voltage applied to these electrodes, and as a result, the second membrane 32F flexurally vibrates.

A second circuit 32c is provided. For example, the second circuit 32c is included in the sensor 130. The second circuit 32c is electrically connected to the second electrode 32e and the second counter electrode 32f.

For example, the second circuit 32c applies an alternating current voltage between the second electrode 32e and the second counter electrode 32f. Thereby, the second membrane 32F is caused to vibrate. For example, the second membrane 32F flexurally vibrates. Thereby, a sound wave (e.g., an ultrasonic wave) is generated from the second membrane 32F. In such a case, the second element 32 functions as a sound wave transmitter.

When a sound wave (e.g., an ultrasonic wave) is applied to the second membrane 32F, the second membrane 32F vibrates. A voltage is generated between the second electrode 32e and the second counter electrode 32f according to the vibration. The second circuit 32c receives the generated voltage and is configured to output a signal corresponding to the voltage. In such a case, the second element 32 functions as a sound wave receiver.

For example, the second member 20 functions as a waveguide. The second member 20 includes a second end portion 20e, which corresponds to the third opening 23, and a second other portion 20o. The position in the first direction (the Z-axis direction) of the second other portion 20o is between the position in the first direction of the second end portion 20e and the position in the first direction of the second element 32. A second thickness t2 of the second end portion 20e along the second direction (e.g., the X-axis direction) is less than a thickness to2 of the second other portion 20o along the second direction.

The reflection of the sound wave by the second end portion 20e can be suppressed thereby. The noise that is due to the reflection of the sound wave by the second end portion 20e can be suppressed. A sensor and an inspection device can be provided in which the resolution can be increased.

For example, the second thickness t2 is less than the wavelength of the sound wave emitted from the second membrane 32F. For example, a length L2 along the first direction (the Z-axis direction) of the second member 20 is not less than 5 times the wavelength of the sound wave.

For example, the change amount of a second inner diameter di2 of the second member 20 is not more than 0.1 times the length L2 along the first direction of the second member 20. The change amount of the second inner diameter di2 may be 0.01 times the length L2 along the first direction of the second member 20 or less.

For example, at least a portion of a second outer side surface 20of of the second member 20 may be tilted with respect to the first direction (the Z-axis direction). The second member 20 includes a second inner side surface 20if and the second outer side surface 20of. The angle between the first direction (the Z-axis direction) and at least a portion of the second outer side surface 20of is greater than the angle between the first direction and the second inner side surface 20if.

For example, the change rate (the gradient) of a second outer diameter do2 of the second member 20 with respect to the change of the position in the first direction is greater than the change rate (the gradient) of the second inner diameter di2 of the second member 20 with respect to the change of the position in the first direction. The change of the second outer diameter do2 may be continuous or discontinuous (step-like).

The shape of the second inner side surface 20if of the second member 20 in a cross section (the X-Y plane) perpendicular to the first direction may be circular or polygonal.

A gap g2 may be provided between the second member 20 and the second element 32. For example, the acoustic impedance of the second member 20 is not less than 1000 times the acoustic impedance of air. The second member 20 includes, for example, at least one selected from the group consisting of iron, aluminum, paper, and a resin.

Figure 7A:
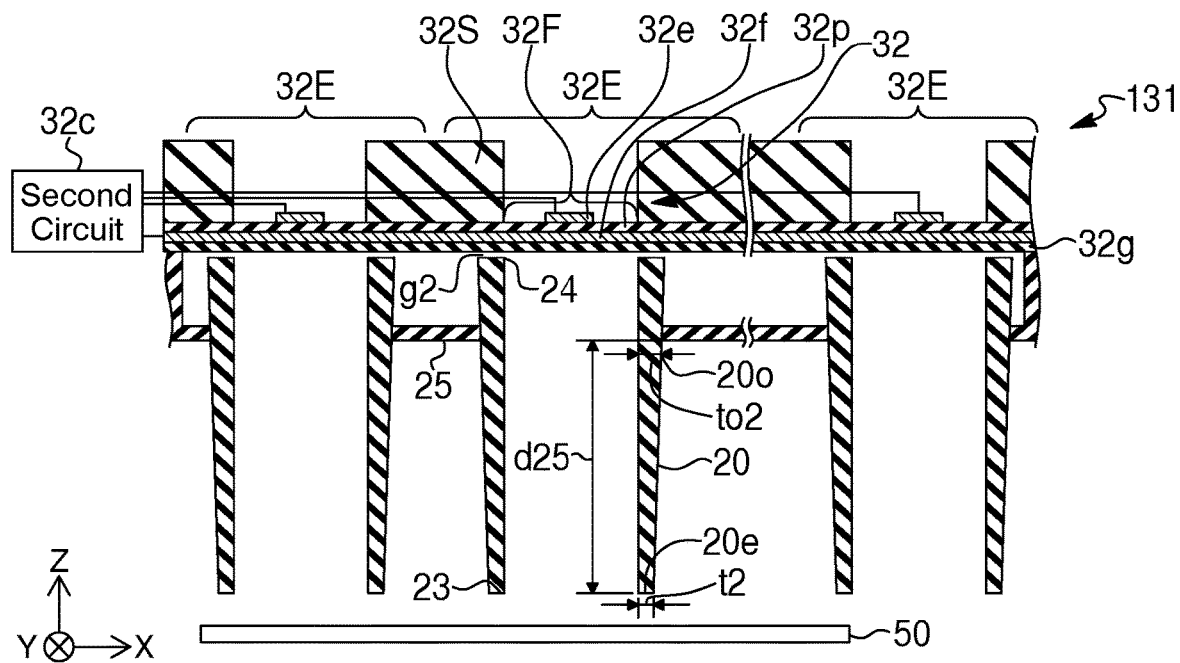
FIGS. 7A and 7B are schematic views illustrating a sensor according to the third embodiment.
Figure 7B:
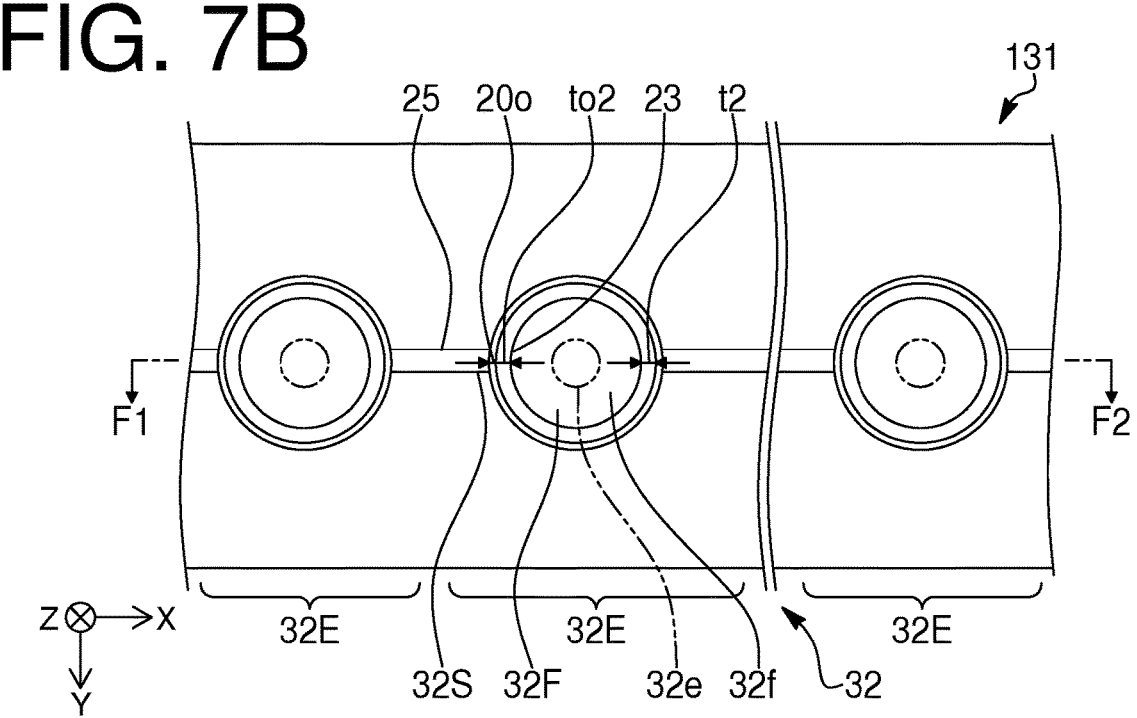

FIGS. 7A and 7B are schematic views illustrating a sensor according to the third embodiment.

FIG. 7A is a line F1-F2 cross-sectional view of FIG. 7B. FIG. 7B is a plan view.

As shown in FIGS. 7A and 7B, the sensor 131 according to the embodiment includes multiple second element parts 32E. The sensor 131 further includes a second link member 25. The second link member 25 links the second member 20 of one of the multiple second element parts 32E and the second member 20 of another one of the multiple second element parts 32E. The distance along the first direction (the Z-axis direction) between the second link member 25 and the third opening 23 of the second member 20 of the one of the multiple second element parts 32E is taken as a distance d25. The distance d25 is not less than 5 times the wavelength of the sound wave emitted from the second membrane 32F of the second element 32 of the one of the multiple second element parts 32E. Thereby, the noise, etc., can be suppressed when the sound wave reflected by the second link member 25 travels toward the object 50, etc.

Figure 8:
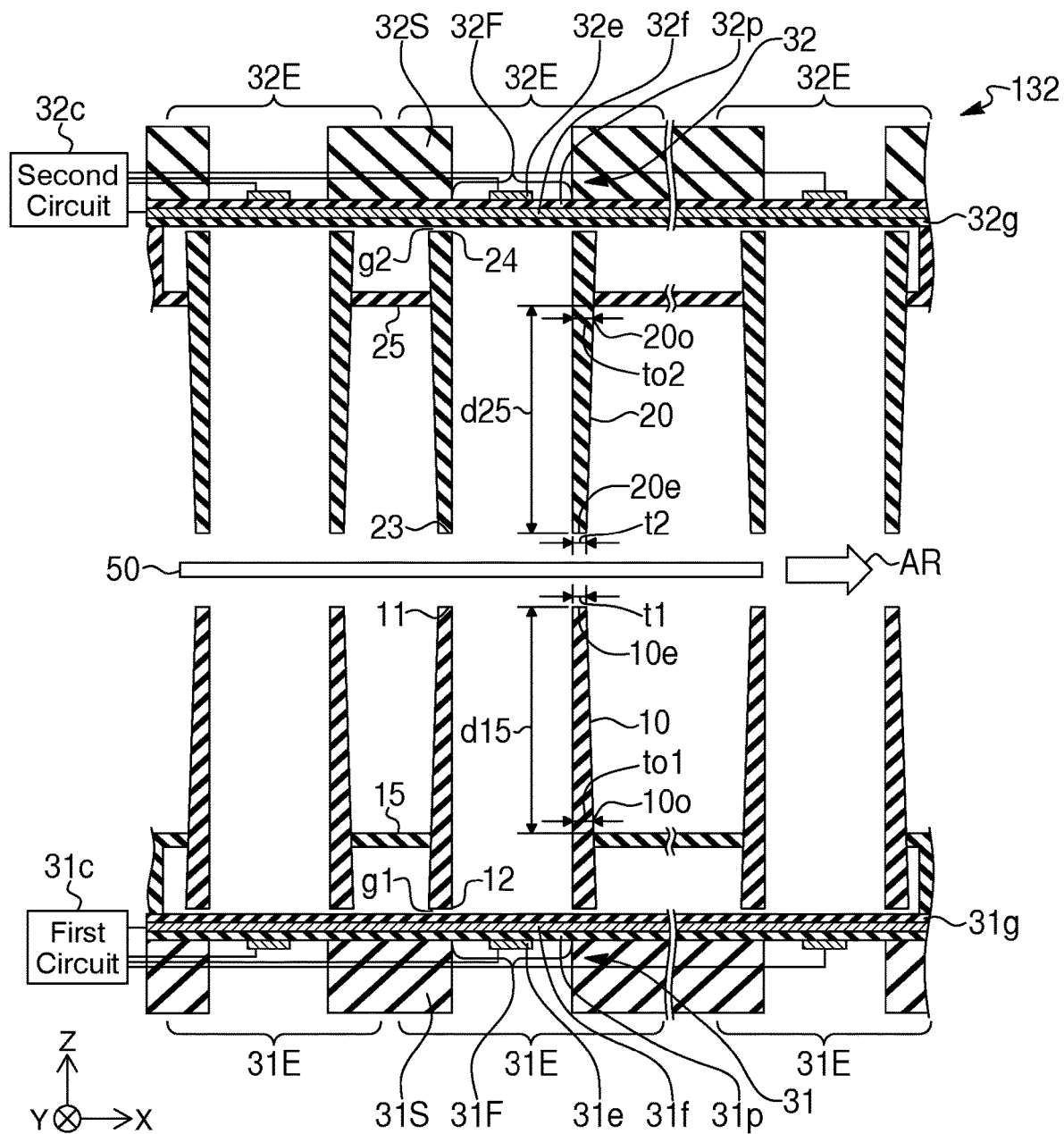
FIG. 8 is a schematic view illustrating a sensor according to the third embodiment.

FIG. 8 is a schematic view illustrating a sensor according to the third embodiment.

As shown in FIG. 8, the sensor 132 according to the embodiment includes the first element part 31E and the second element part 32E. The multiple first element parts 31E and the multiple second element parts 32E are provided in the example.

As described above, the first element part 31E includes the first member 10 and the first element 31. The second element part 32E includes the second member 20 and the second element 32. The first member 10 is between the first element 31 and the second element 32 in the first direction (the Z-axis direction). The second member 20 is between the first member 10 and the second element 32 in the first direction (the Z-axis direction). For example, the object 50 moves along a direction AR of FIG. 8.

For example, a sound wave (e.g., an ultrasonic wave) is generated by the second element 32. The sound wave propagates through the second member 20 and is incident on the object 50. The sound wave that passes through the object 50 propagates through the first member 10 and is incident on the first element 31. The second element 32 functions as a sound wave transmitter. The first element 31 functions as a sound wave receiver.

For example, a sound wave (e.g., an ultrasonic wave) may be generated by the first element 31. The sound wave propagates through the first member 10 and is incident on the object 50. The sound wave that passes through the object 50 propagates through the second member 20 and is incident on the second element 32. The first element 31 functions as a sound wave transmitter. The second element 32 functions as a sound wave receiver.

The first member 10 and the second member 20 are provided in the embodiment. The crosstalk between the multiple elements can be suppressed thereby.

Fourth Embodiment

Figure 9A:
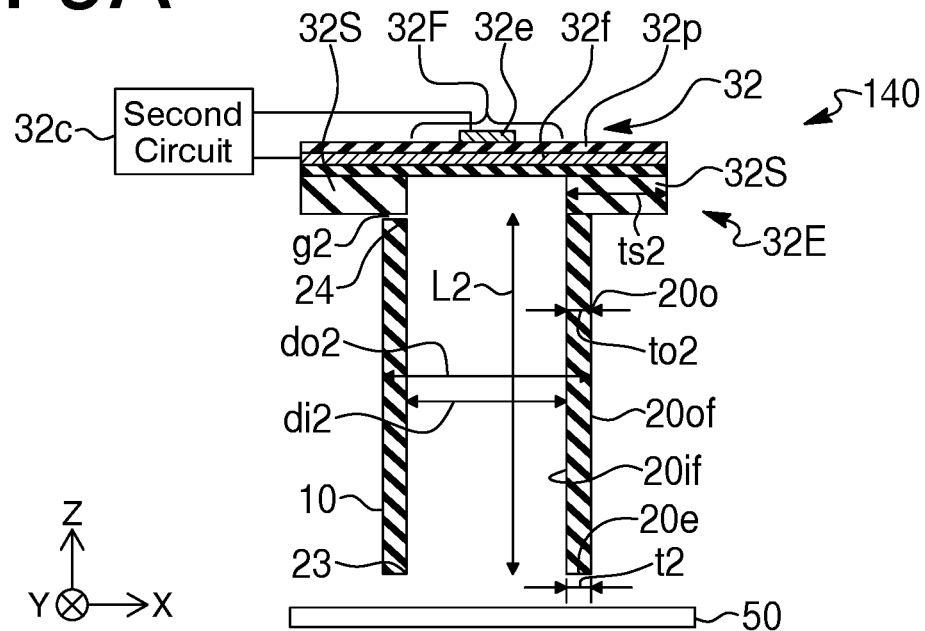
FIGS. 9A and 9B are schematic views illustrating a sensor according to a fourth embodiment.
Figure 9B:
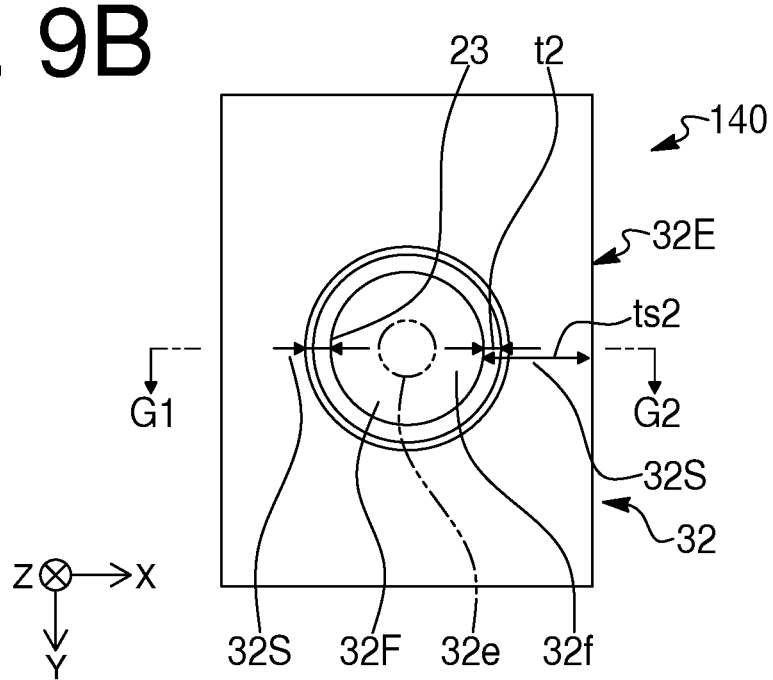

FIGS. 9A and 9B are schematic views illustrating a sensor according to a fourth embodiment.

FIG. 9A is a line G1-G2 cross-sectional view of FIG. 9B. FIG. 9B is a plan view.

As shown in FIGS. 9A and 9B, the sensor 140 according to the embodiment includes the second element part 32E. The second element part 32E includes the second member 20 and the second element 32. The second member 20 is tubular and extends along the first direction (the Z-axis direction). The second member 20 includes the third opening 23 and the fourth opening 24. The direction from the third opening 23 toward the fourth opening 24 is along the first direction (the Z-axis direction). The second element 32 includes the vibratile second membrane 32F, and the second supporter 32S supporting the second membrane 32F. The fourth opening 24 is between the third opening 23 and the second membrane 32F in the first direction (the Z-axis direction).

The second member 20 includes the second end portion 20e that corresponds to the third opening 23. The position in the first direction (the Z-axis direction) of at least a portion of the second supporter 32S is between the position in the first direction of the second membrane 32F and the position in the first direction of the second end portion 20e. The second thickness t2 of the second end portion 20e along the second direction (e.g., the X-axis direction) is less than a thickness ts2 of the second supporter 32S along the second direction. By setting the second end portion 20e to be thin, the reflection of the sound wave by the second end portion 20e can be suppressed.

The second member 20 may include the second end portion 20e, which corresponds to the third opening 23, and the second other portion 20o. The position in the first direction (the Z-axis direction) of the second other portion 20o is between the position in the first direction of the second end portion 20e and the position in the first direction of the second element 32. The second thickness t2 of the second end portion 20e along the second direction (e.g., the X-axis direction) may be less than the thickness to2 of the second other portion 20o along the second direction.

Figure 10A:
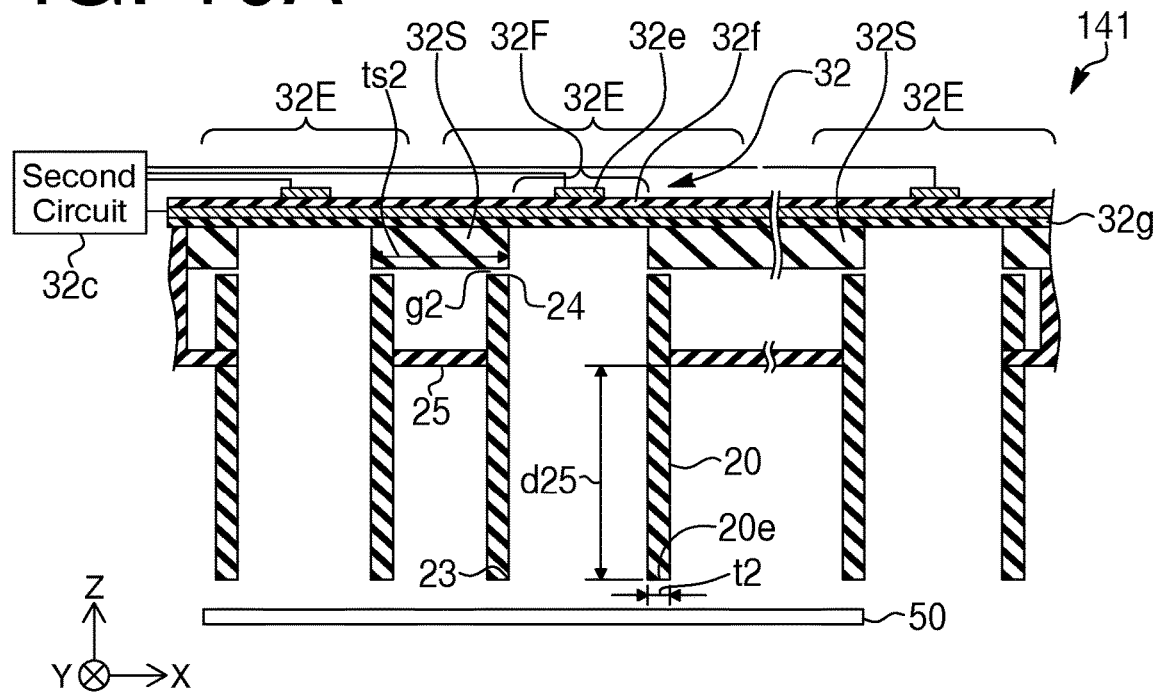
FIGS. 10A and 10B are schematic views illustrating a sensor according to the fourth embodiment.
Figure 10B:
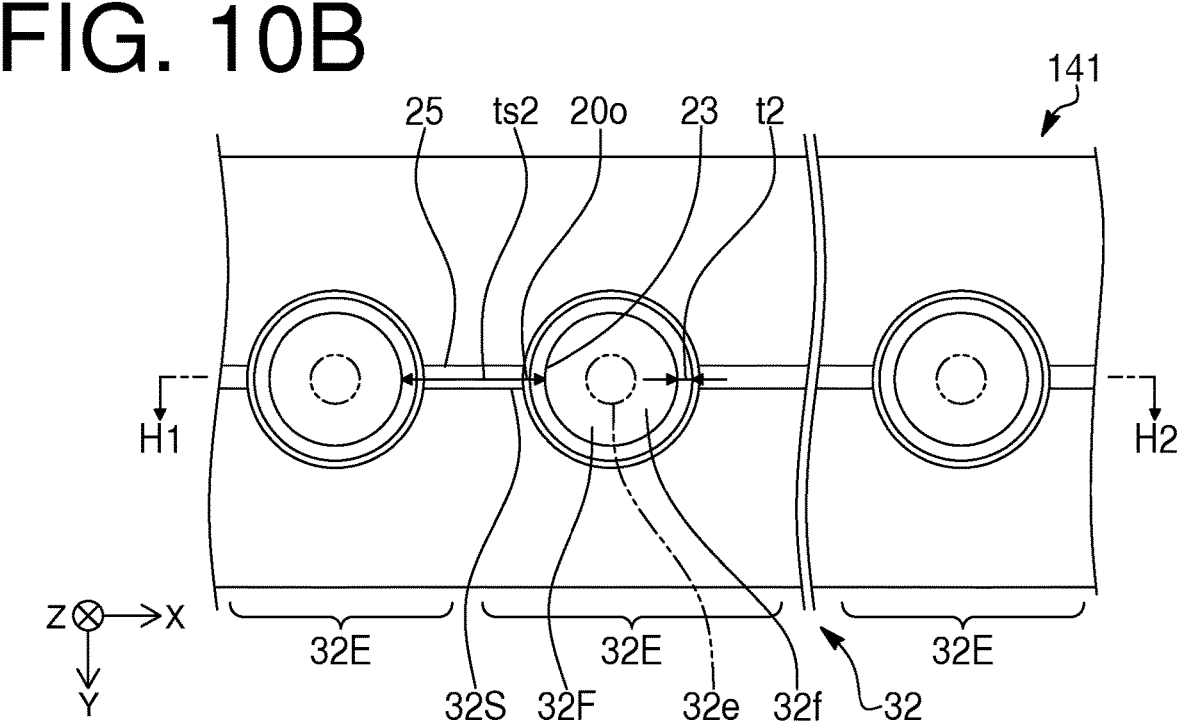

FIGS. 10A and 10B are schematic views illustrating a sensor according to the fourth embodiment.

FIG. 10A is a line H1-H2 cross-sectional view of FIG. 10B. FIG. 10B is a plan view.

As shown in FIGS. 10A and 10B, the sensor 141 according to the embodiment includes the multiple second element parts 32E. The sensor 141 further includes the second link member 25. The second link member 25 links the second member 20 of one of the multiple second element parts 32E and the second member 20 of another one of the multiple second element parts 32E. The distance d25 along the first direction (the Z-axis direction) between the second link member 25 and the third opening 23 of the second member 20 of the one of the multiple second element parts 32E is not less than 5 times the wavelength of the sound wave emitted from the second membrane 32F of the second element 32 of the one of the multiple second element parts 32E. Thereby, the noise, etc., can be suppressed when the sound wave reflected by the second link member 25 travels toward the object 50, etc.

Figure 11:
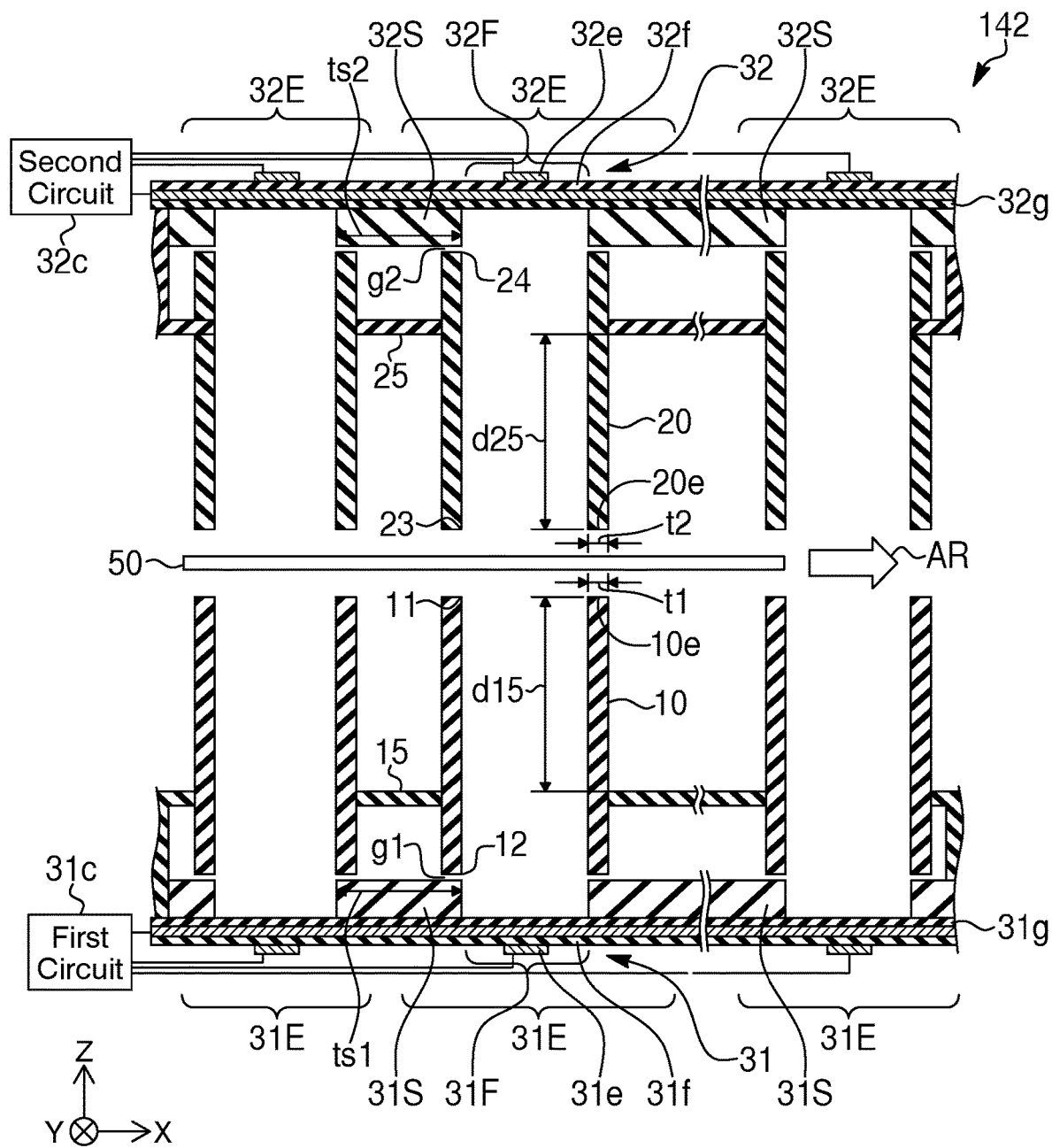
FIG. 11 is a schematic view illustrating a sensor according to the fourth embodiment.

FIG. 11 is a schematic view illustrating a sensor according to the fourth embodiment.

As shown in FIG. 11, the sensor 142 according to the embodiment includes the first element part 31E and the second element part 32E. The multiple first element parts 31E and the multiple second element parts 32E are provided in the example.

As described above, the first element part 31E includes the first member 10 and the first element 31. The second element part 32E includes the second member 20 and the second element 32. The first member 10 is between the first element 31 and the second element 32 in the first direction (the Z-axis direction). The second member 20 is between the first member 10 and the second element 32 in the first direction (the Z-axis direction). For example, the object 50 moves along direction AR of FIG. 11.

For example, the second element 32 functions as a sound wave transmitter, and the first element 31 functions as a sound wave receiver. For example, the first element 31 may function as a sound wave transmitter, and the second element 32 may function as a sound wave receiver. The first member 10 and the second member 20 are provided. The crosstalk between the multiple elements can be suppressed thereby.

In the embodiment, a combination of at least one of the sensors according to the first and second embodiments and at least one of the sensors according to the first and second embodiments may be used.

For example, the first element 31 emits a first sound wave. The second element 32 receives the first sound wave passing through the first member 10 and through the second member 20. For example, the second element 32 emits a second sound wave. The first element 31 receives the second sound wave passing through the second and first members 20 and 10.

For example, the first circuit 31c that is connected to the first element 31 and the second circuit 32c that is connected to the second element 32 are provided. For example, the first circuit 31c causes the first membrane 31F to vibrate. In such a case, the second circuit 32c is configured to output a signal corresponding to the vibration of the second membrane 32F. For example, in the case where the second circuit 32c causes the second membrane 32F to vibrate, the first circuit 31c is configured to output a signal corresponding to the vibration of the first membrane 31F.

Figure 12:
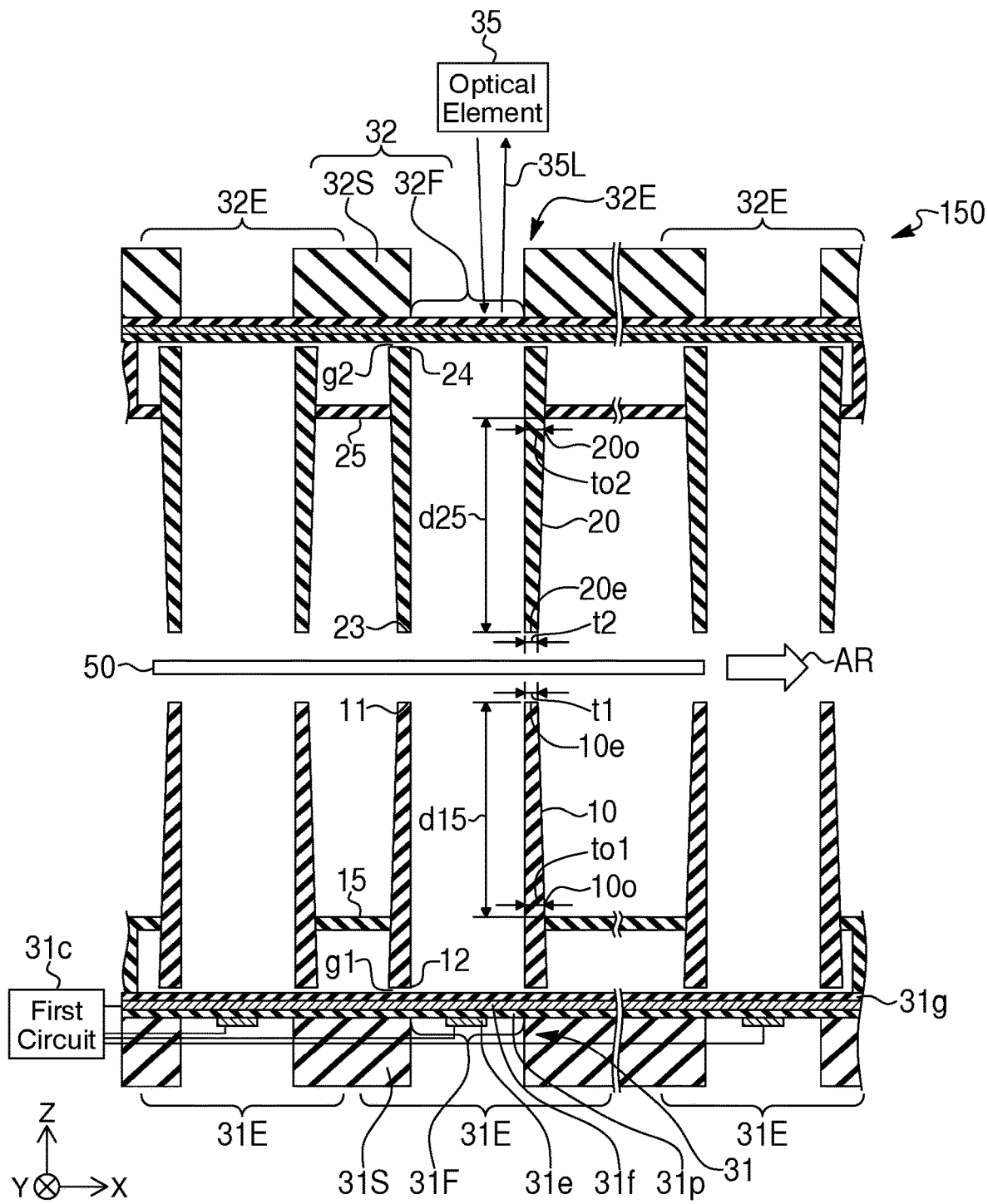
FIG. 12 is a schematic view illustrating sensors according to the fourth embodiment.
Figure 13:
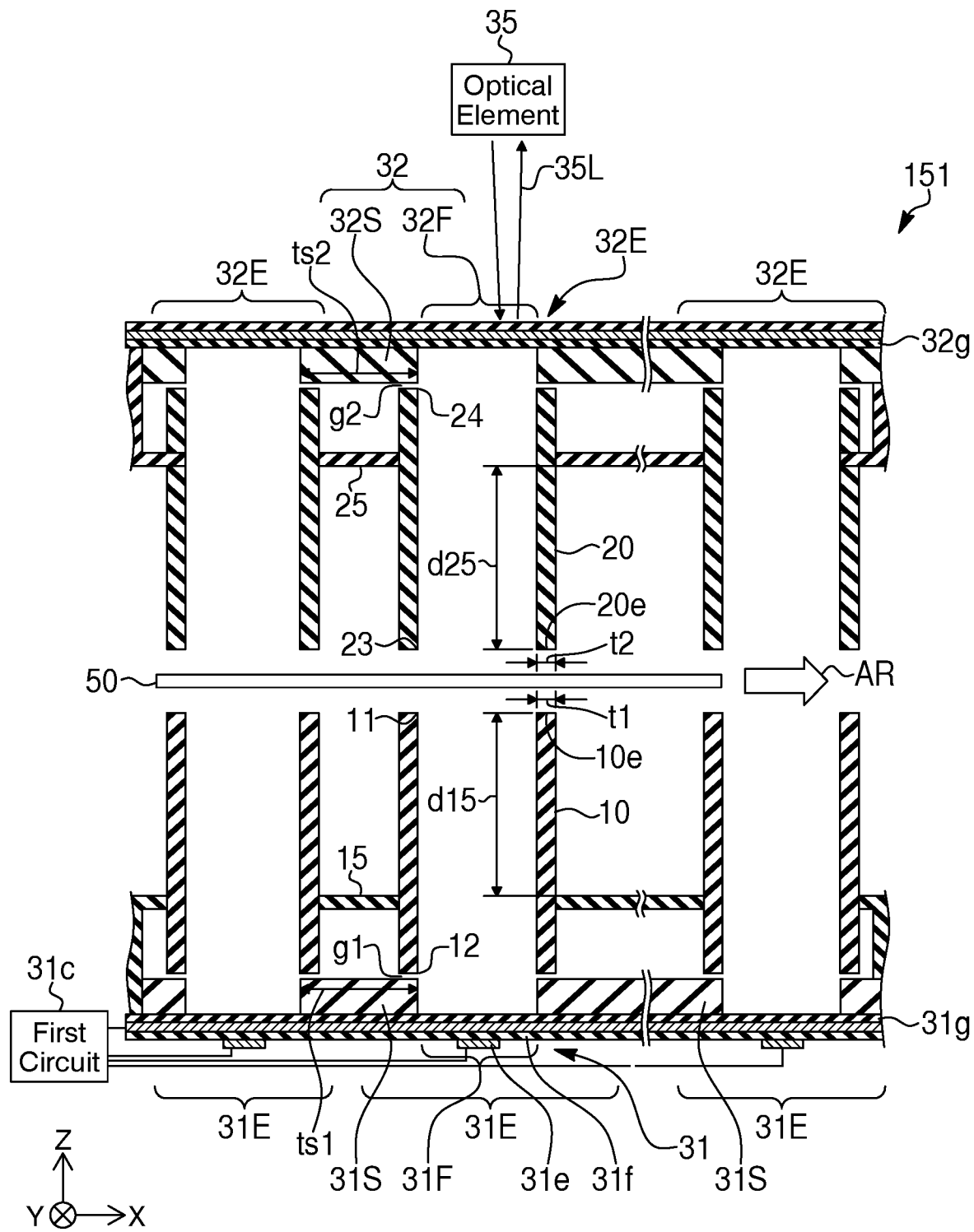
FIG. 13 is a schematic view illustrating sensors according to the fourth embodiment.

FIGS. 12 and 13 are schematic views illustrating sensors according to the fourth embodiment.

As shown in FIGS. 12 and 13, the first element part 31E and the second element part 32E are provided in sensors 150 and 151 according to the embodiment. In the example, the multiple first element parts 31E and the multiple second element parts 32E are provided. The first circuit 31c, which is connected to the first element 31, and an optical element 35 are provided in the sensors 150 and 151. The first circuit 31c causes the first membrane 31F to vibrate. The optical element 35 is configured to output a signal corresponding to the vibration of the second membrane 32F. For example, the optical element 35 detects light 35L that is reflected by the surface of the second membrane 32F. The optical element 35 may emit the light 35L toward the second membrane 32F. For example, any configuration that detects the vibration of the second membrane 32F is applicable to the second element part 32E. The optical element 35 may include, for example, a displacement meter that uses coherent light, etc.

Fifth Embodiment

The embodiment relates to an inspection device.

Figure 14:
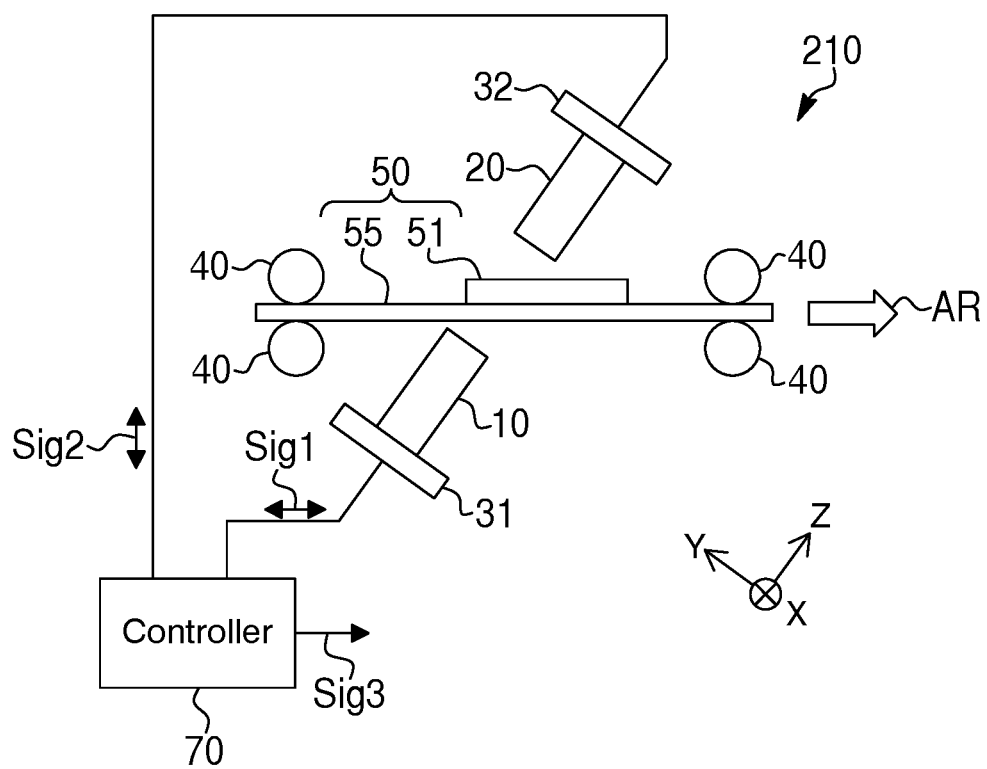
FIG. 14 is a schematic view illustrating the inspection device according to a fifth embodiment.

FIG. 14 is a schematic view illustrating the inspection device according to a fifth embodiment.

As shown in FIG. 14, the inspection device 210 includes the first element part 31E, the second element part 32E, and a feeder 40. The feeder 40 moves the object 50 (the inspection object) between the first member 10 and the second member 20. The inspection device 210 inspects the object 50.

The object 50 includes, for example, at least one of a banknote, a gift certificate, a check, a security, or a card-like medium. The object 50 includes paper or a resin. The object 50 is, for example, sheet-like.

The object 50 includes, for example, a base body 55 (a banknote, etc.) and foreign matter 51. The foreign matter 51 includes tape or the like that is adhered to the base body 55.

The object 50 is fed by the feeder 40, and the object 50 passes through the space between the first member 10 and the second member 20. The feeder 40 is, for example, a roller, a belt, etc. The feeder 40 moves the object 50 along direction AR in the space. Direction AR crosses the direction from the first member 10 toward the second member 20.

One of the first element part 31E or the second element part 32E emits a sound wave (e.g., an ultrasonic wave). The other of the first element part 31E or the second element part 32E receives the sound wave (e.g., the ultrasonic wave). The state of the received sound wave changes according to the state of the object 50. By analyzing the received ultrasonic wave, the state of the object 50 (e.g., an abnormality, etc.) can be detected.

For example, a controller 70 (e.g., the control circuit) or the like is provided. When the second element part 32E is used as a transmitter, a second signal Sig2 is supplied from the controller 70 to the second element part 32E. A sound wave that is based on the second signal Sig2 is emitted from the second element part 32E. The sound wave passes through the space between the first member 10 and the second member 20 and is incident on the first element part 31E. A first signal Sig1 that is received by the first element part 31E is supplied to the controller 70. A third signal Sig3 that is based on the first signal Sig1 is output from the controller 70. The third signal Sig3 includes, for example, the results of analyzing the first signal Sig1.

In the inspection device 210, for example, the object 50 (e.g., a paper sheet or the like) that is fed at high speed can be detected with high accuracy at high resolution.

In the embodiment, for example, the inspection device 210 can inspect the thickness of the paper sheet or the like. For example, the inspection device 210 can inspect the existence or absence of tape adhered to the paper sheet or the like.

For example, there are cases where tape is adhered to a banknote to repair damage of the banknote, etc. A method for inspecting the existence or absence of the foreign matter 51 such as tape or the like is desirable. For example, by using multiple ultrasonic transceivers, an ultrasonic wave is irradiated on the banknote that is fed at high speed, and the strength of a transmitted wave passing through the banknote is measured. The foreign matter 51 such as tape, etc., exists at a portion where the strength of the measured transmitted wave is low.

It was found that there are cases where unnecessary reflected waves or unnecessary diffracted waves are generated in such an inspection device. When reflected waves or diffracted waves are generated, crosstalk occurs between the multiple elements. There are cases where the inspection accuracy is reduced thereby.

In the embodiment, a tubular member (e.g., one of the first member 10 or the second member 20) is provided between the object 50 and the receiver of the ultrasonic wave. Thereby, for example, the crosstalk between the multiple elements can be suppressed. For example, the inspection accuracy of the end portions of the object 50 can be increased. For example, a sensor and a inspection device with high resolution can be provided.

In the embodiment, a tubular member (e.g., the other of the first member 10 or the second member 20) may be provided between the object 50 and a transmitter of the ultrasonic wave. The crosstalk between the multiple elements can be more effectively suppressed. For example, the inspection accuracy of the end portions of the object 50 can be further increased. For example, a sensor and an inspection device with higher resolution can be provided.

According to the embodiments, the foreign matter 51 and the distribution of the thickness of the paper sheet or the like (the object 50) fed at high speed can be detected with high accuracy with a resolution that is not more than the size of the element.

In the embodiment, the first element 31 and the second element 32 may include, for example, piezoelectric transducers. The first element 31 and the second element 32 may be, for example, MEMS (Micro Electro Mechanical Systems).

For example, there are cases where a diffracted wave is generated at the end portion of the object 50. According to the embodiment, by providing the tubular member, the diffracted wave that travels toward the receiver can be reduced. For example, the foreign matter 51 or the thickness of the object 50 can be detected with high accuracy. For example, the embodiment is applicable to the automatic discrimination of a paper sheet or the like (e.g., a banknote). For example, the embodiment is applicable to the automatic discrimination of any printed matter.

The embodiments may include, for example, the following configurations (e.g., technological proposals).

Configuration 1

A sensor, comprising:
a first element part including
a first member extending along a first direction, the first member being tubular and including a first opening and a second opening, a direction from the second opening toward the first opening being along the first direction, and
a first element,
the first element including
a first membrane, the first membrane being vibratile, and
a first supporter supporting the first membrane,
the second opening being between the first opening and the first membrane in the first direction.

Configuration 2

The sensor according to Configuration 1, wherein
the first member includes a first end portion and a first other portion,
the first end portion corresponds to the first opening, a position in the first direction of the first other portion is between a position in the first direction of the first end portion and a position in the first direction of the first element, and a first thickness of the first end portion along a second direction crossing the first direction is less than a thickness of the first other portion along the second direction.

Configuration 3

The sensor according to Configuration 1, wherein the first member includes a first end portion corresponding to the first opening, a position in the first direction of at least a portion of the first supporter is between a position in the first direction of the first membrane and a position in the first direction of the first end portion, and a first thickness of the first end portion along a second direction crossing the first direction is less than a thickness of the first supporter along the second direction.

Configuration 4

The sensor according to any one of Configurations 1 to 3, wherein the first thickness is less than a wavelength of a sound wave emitted from the first membrane.

Configuration 5

The sensor according to Configuration 4, wherein a length along the first direction of the first member is not less than 5 times the wavelength.

Configuration 6

The sensor according to any one of Configurations 1 to 5, wherein at least a portion of an outer side surface of the first member is tilted with respect to the first direction.

Configuration 7

The sensor according to any one of Configurations 1 to 6, wherein the first member includes an inner side surface and an outer side surface, and an angle between the first direction and at least a portion of the outer side surface is greater than an angle between the first direction and the inner side surface.

Configuration 8

The sensor according to any one of Configurations 1 to 7, wherein a change rate of an outer diameter of the first member with respect to a change of a position in the first direction is greater than a change rate of an inner diameter of the first member with respect to the change of the position in the first direction.

Configuration 9

The sensor according to any one of Configurations 1 to 8, further comprising:

a first link member, a plurality of the first element parts being provided, the first link member linking the first member of one of the plurality of first element parts and the first member of an other one of the plurality of first element parts, a distance along the first direction between the first link member and the first end portion of the first member of the one of the plurality of first element parts being not less than 5 times a wavelength of a sound wave emitted from the first membrane of the first element of the one of the plurality of first element parts.

Configuration 10

The sensor according to any one of Configurations 1 to 9, wherein an acoustic impedance of the first member is not less than 1000 times an acoustic impedance of air.

Configuration 11

The sensor according to any one of Configurations 1 to 10, wherein the first member includes at least one selected from the group consisting of iron, aluminum, paper, and a resin.

Configuration 12

The sensor according to any one of Configurations 1 to 11, wherein a gap is between the first member and the first element.

Configuration 13

The sensor according to any one of Configurations 1 to 12, wherein the first membrane flexurally vibrates.

Configuration 14

The sensor according to any one of Configurations 1 to 13, further comprising:

a second element part, the second element part including a second member and a second element, the first member being between the first element and the second element in the first direction, the second member being between the first member and the second element in the first direction, the second member being tubular, extending along the first direction, and including a third opening and a fourth opening, a direction from the third opening toward the fourth opening being along the first direction, the second element including a second membrane, the second membrane being vibratile, and a second supporter supporting the second membrane, the fourth opening being between the third opening and the second membrane in the first direction.

Configuration 15

The sensor according to Configuration 14, wherein the second member includes a second end portion and a second other portion, the second end portion corresponds to the third opening, a position in the first direction of the second other portion is between a position in the first direction of the second end portion and a position in the first direction of the second element, and a second thickness of the second end portion along the second direction is less than a thickness of the second other portion along the second direction.

Configuration 16

The sensor according to Configuration 14, wherein the second member includes a second end portion corresponding to the third opening, a position in the first direction of at least a portion of the second supporter is between a position in the first direction of the second membrane and a position in the first direction of the second end portion, and a second thickness of the second end portion along the second direction is less than a thickness of the second supporter along the second direction.

Configuration 17

The sensor according to any one of Configurations 14 to 16, wherein the first element emits a first sound wave, and the second element receives the first sound wave passing through the first member and through the second member.

Configuration 18

The sensor according to any one of Configurations 14 to 17, further comprising:

a first circuit connected to the first element; and a second circuit connected to the second element, the first circuit causing the first membrane to vibrate,
the second circuit being configured to output a signal corresponding to a vibration of the second membrane.
Configuration 19
The sensor according to any one of Configurations 14 to 17, further comprising:
a first circuit connected to the first element; and
an optical element,
the first circuit causing the first membrane to vibrate,
the optical element being configured to output a signal corresponding to a vibration of the second membrane.
Configuration 20
An inspection device, comprising:
the sensor according to any one of Configurations 14 to 19; and
a feeder moving an object between the first member and the second member.

According to the embodiments, a sensor and an inspection device can be provided in which the resolution can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors and inspection devices such as members, element parts, elements, films, electrodes, circuits, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors, and inspection devices practicable by an appropriate design modification by one skilled in the art based on the sensors, and the inspection devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor for a sound wave, comprising:
a first element part including:
a first member extending along a first direction and for guiding the sound wave, the first member being tubular and including a first opening and a second opening, a direction from the second opening toward the first opening being along the first direction, and
a first element,
the first element including:
a first membrane, the first membrane being vibratile for transmitting and/or receiving the sound wave,
a first sensing means for outputting a signal corresponding to vibration of the first membrane and/or for generating the sound wave by causing vibration of the first membrane, and
a first supporter supporting the first membrane, the second opening being between the first opening and the first membrane in the first direction.

2. The sensor for a sound wave according to claim 1, wherein
the first member includes a first end portion and a first other portion,
the first end portion corresponds to the first opening,
a position in the first direction of the first other portion is between a position in the first direction of the first end portion and a position in the first direction of the first element, and
a first thickness of the first end portion along a second direction crossing the first direction is less than a thickness of the first other portion along the second direction.

3. The sensor for a sound wave according to claim 1, wherein
the first member includes a first end portion corresponding to the first opening,
a position in the first direction of at least a portion of the first supporter is between a position in the first direction of the first membrane and a position in the first direction of the first end portion, and
a first thickness of the first end portion along a second direction crossing the first direction is less than a thickness of the first supporter along the second direction.

4. The sensor for a sound wave according to claim 1, wherein
a first thickness of a first end portion of the first member is less than a wavelength of a sound wave emitted from the first membrane connected to the first sensing means.

5. The sensor for a sound wave according to claim 4, wherein
a length along the first direction of the first member is not less than 5 times the wavelength.

6. The sensor for a sound wave according to claim 1, further comprising:
a first link member,
a plurality of the first element parts being provided,
the first link member linking the first member of one of the plurality of first element parts and the first member of an other one of the plurality of first element parts,
a distance along the first direction between the first link member and the first end portion of the first member of the one of the plurality of first element parts being not less than 5 times a wavelength of a sound wave emitted from the first membrane, connected to the first sensing means, of the first element of the one of the plurality of first element parts.

7. The sensor for a sound wave according to claim 1, further comprising:
a second element part,
the second element part including a second member and a second element,
the first member being between the first element and the second element in the first direction,
the second member being between the first member and the second element in the first direction, the second member being tubular, extending along the first direction and for guiding the sound wave, and including a third opening and a fourth opening, a direction from the third opening toward the fourth opening being along the first direction, the second element including:
a second membrane, the second membrane being vibratile for transmitting and/or receiving the sound wave,
a second sensing means for outputting a signal corresponding to vibration of the second membrane and/or for generating the sound wave by causing vibration of the second membrane, and
a second supporter supporting the second membrane,
the fourth opening being between the third opening and the second membrane in the first direction.

8. The sensor for a sound wave according to claim 7, wherein
the first element, including the first sensing means, is configured to emit a first sound wave, and
the second element, including the second sensing means, is configured to receive the first sound wave passing through the first member and through the second member.

9. The sensor for a sound wave according to claim 8, wherein
the first member includes a first end portion and a first other portion,
the first end portion corresponds to the first opening,
a position in the first direction of the first other portion is between a position in the first direction of the first end portion and a position in the first direction of the first element, and
a first thickness of the first end portion along a second direction crossing the first direction is less than a thickness of the first other portion along the second direction.

10. The sensor for a sound wave according to claim 8, wherein
the first member includes a first end portion corresponding to the first opening,
a position in the first direction of at least a portion of the first supporter is between a position in the first direction of the first membrane and a position in the first direction of the first end portion, and
a first thickness of the first end portion along a second direction crossing the first direction is less than a thickness of the first supporter along the second direction.

11. The sensor for a sound wave according to claim 8, wherein a first thickness of a first end portion of the first member is less than a wavelength of a sound wave emitted from the first membrane connected to the first sensing means.

12. The sensor for a sound wave according to claim 8, wherein
a gap is provided between a portion of the first member and the first element, and
another portion of the first member physically contacts the first element.

13. The sensor for a sound wave according to claim 7, further comprising:
a first circuit connected to the first element; and
a second circuit connected to the second element,
the first circuit causing the first membrane, connected to the first sensing means, to vibrate,
the second circuit being configured to output a signal corresponding to a vibration of the second membrane, connected to the second sensing means.

14. An inspection device, comprising:
the sensor for a sound wave according to claim 9; and
a feeder moving an object between the first member and the second member.

15. The sensor for a sound wave according to claim 7, further comprising:
a first circuit connected to the first element; and
an optical element,
the first circuit causing the first membrane, connected to the first sensing means, to vibrate,
the optical element being configured to output a signal corresponding to a vibration of the second membrane, including the second sensing means.

16. The sensor for a sound wave according to claim 1, wherein
a gap is provided between a portion of the first member and the first element, and
another portion of the first member physically contacts the first element.

* * * * *